(12) United States Patent
Giessel et al.

(10) Patent No.: US 12,152,983 B2
(45) Date of Patent: Nov. 26, 2024

(54) EUV REFLECTOMETER

(71) Applicants: Carl Zeiss SMT GmbH, Oberkochen (DE); BESTEC GMBH, Berlin (DE)

(72) Inventors: Tatjana Giessel, Berlin (DE); Marco Roessner, Petershagen (DE)

(73) Assignees: CARL ZEISS SMT GMBH, Oberkochen (DE); BESTEC GMBH, Berlin (DE)

(*) Notice: Subject to any disclaimer, the term of this patent is extended or adjusted under 35 U.S.C. 154(b) by 237 days.

(21) Appl. No.: 17/882,101

(22) Filed: Aug. 5, 2022

(65) Prior Publication Data
US 2022/0381680 A1 Dec. 1, 2022

Related U.S. Application Data

(63) Continuation of application No. PCT/EP2021/052754, filed on Feb. 5, 2021.

(30) Foreign Application Priority Data

Feb. 5, 2020 (DE) .......................... 102020201416.7

(51) Int. Cl.
 G01N 21/33 (2006.01)
 G01N 21/17 (2006.01)
 G01N 21/55 (2014.01)

(52) U.S. Cl.
 CPC ............. *G01N 21/33* (2013.01); *G01N 21/55* (2013.01); *G01N 2021/177* (2013.01)

(58) Field of Classification Search
 CPC .. G01N 21/33; G01N 21/55; G01N 2021/177; G01N 2021/95676;
(Continued)

(56) References Cited

U.S. PATENT DOCUMENTS

| 4,492,466 A | 1/1985 | Aspnes |
| 4,991,934 A | 2/1991 | Hettrick |

(Continued)

FOREIGN PATENT DOCUMENTS

| DE | 69019943 T2 | 11/1995 |
| DE | 10 2018 205 163 A1 | 8/2018 |

(Continued)

OTHER PUBLICATIONS

International Search Report, PCT/EP2021/052754, Apr. 26, 2021, 5 pages.
(Continued)

*Primary Examiner* — Tarifur R Chowdhury
*Assistant Examiner* — Akbar H. Rizvi
(74) *Attorney, Agent, or Firm* — Edell, Shapiro & Finnan, LLC

(57) ABSTRACT

An EUV reflectometer includes a radiation source, a beam shaping unit (130) generating a measurement beam (190) from the radiation; a positioning device (500) for holding and positioning a test object (110) relative to the measurement beam in plural degrees of freedom; and a detector that detects the EUV radiation reflected by the test object. The positioning device has a main carrier (520), which is rotatable about a vertical rotation axis and on which a parallel kinematic multi-axis system (530) having a multiplicity of actuators is arranged. A common platform (540) movable in three linear and three rotational degrees of freedom carries a holding device (550) for holding the test object and a rotary drive for rotating the holding device about a rotation axis. An associated measuring system (700) determines the location and position of the test object in space and/or in relation to the measurement beam.

23 Claims, 8 Drawing Sheets

(58) Field of Classification Search
CPC .......... G01N 21/8806; G01N 21/8851; G01N 2021/8845; G01N 2201/104

See application file for complete search history.

(56) References Cited

U.S. PATENT DOCUMENTS

| | | | |
|---|---|---|---|
| 10,101,671 | B2 | 10/2018 | Quintanilha et al. |
| 2017/0336282 | A1* | 11/2017 | Kobayashi .......... G03F 7/70175 |
| 2019/0210217 | A1* | 7/2019 | Jetté ...................... B25J 9/0069 |
| 2019/0302010 | A1 | 10/2019 | Porter et al. |
| 2019/0378012 | A1* | 12/2019 | Tripodi ............... G03F 7/70683 |

FOREIGN PATENT DOCUMENTS

| | | |
|---|---|---|
| DE | 102017201794 A1 | 8/2018 |
| EP | 2698598 A1 | 2/2014 |
| JP | 2013185933 A | 9/2013 |
| KR | 20180095679 A | 8/2018 |

OTHER PUBLICATIONS

German Office Action, Application No. 10 2020 201 416.7, Feb. 5, 2020, 12 pages (no translation currently available).

Very large reflectometer under construction, Bestec GmbH, Jan. 7, 2019, 2 pages.

Scholze et al., "Characterization of the measurement uncertainty of a laboratory EUV reflectometer for large optics", Institute of Physics Publishing, Measurement Science and Technology, 18, (Nov. 2006), pp. 126-130.

Padmore, "Optimization of soft x-ray monochromators (invited)", Review of Scientific Instruments 60. 1608; (Sep. 1988); published online Aug. 19, 1998, 10 pages.

Hogrefe et al., "Application of Spherical Gratings in Synchrotron Radiation Spectroscopy", Lawrence Berkeley National Laboratory Recent Work, publication date, May 1, 1986, 18 pages.

Padmore, Application Of A Simple Rotational Spherical Grating Mounting To High Resolution Soft X-Ray Spectroscopy, SPIE, Jan. 1, 1986, 10 pages.

Ratel et al., "Direct sample positioning and alignment methodology for strain measurement by diffraction", Review of Scientific Instruments, published online Apr. 15, 2005, 6 pages.

Van Loyen et al., "New laboratory EUV reflectometer for large optics using a laser plasma source", Conference proceedings of SPIE 5038, (Jun. 2003), 12 pages.

Gullikson et al., "A Soft-X-Ray/EUV Reflectometer Based on a Laser Produced Plasma Source" Journal of X-Ray Sci Techology, 3, received Apr. 29, 1992, revised Aug. 28, 1992, pp. 283-299.

Korean Office Action with English translation, Application No. 10-2022-7029952, Apr. 26, 2024, 9 pages.

* cited by examiner

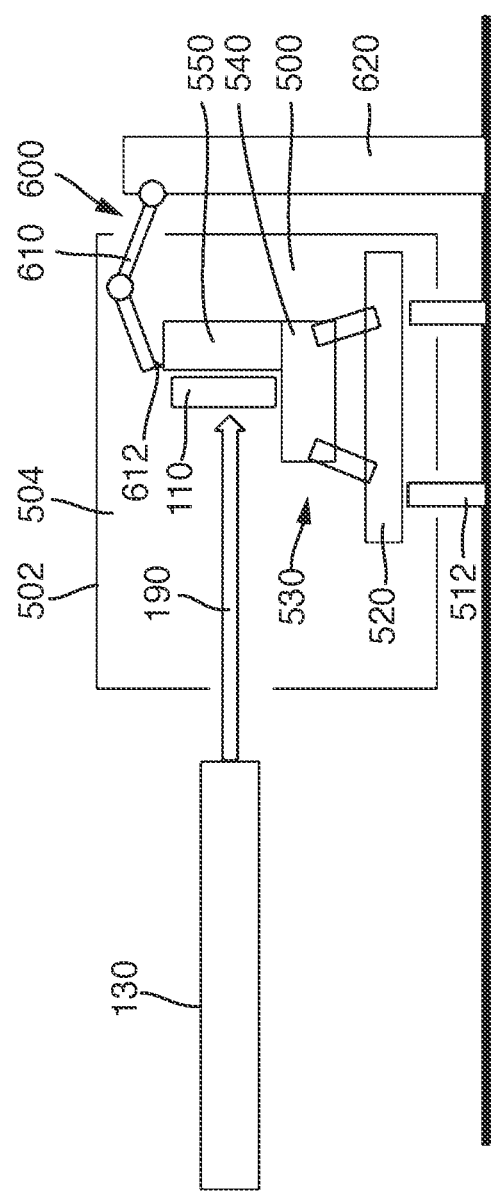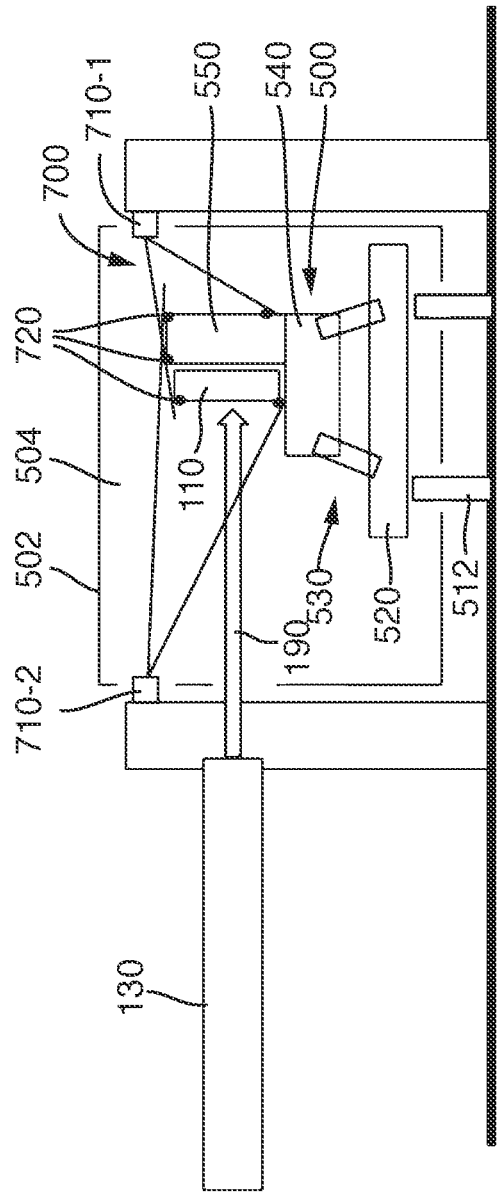

EUV REFLECTOMETER

CROSS REFERENCE TO RELATED APPLICATIONS

This is a Continuation of International Application PCT/EP2021/052754, which has an international filing date of Feb. 5, 2021, and which claims the priority of the German patent application 10 2020 201 416.7, filed on Feb. 5, 2020. The disclosures of both applications are incorporated herein by reference.

FIELD OF THE INVENTION

The invention relates to an EUV reflectometer for measuring the reflectivity of a test object having a reflective effect for EUV radiation, depending on the wavelength of the EUV radiation and on the angle of incidence of the EUV radiation on a reflective surface of the test object.

BACKGROUND

In this application, the term "EUV reflectometer" denotes a measurement system for measuring reflection properties of a test object for electromagnetic radiation at wavelengths in the extreme ultraviolet (EUV) spectral range.

The designation EUV (Extreme Ultraviolet) denotes a wavelength range of approximately 6 nm to approximately 20 nm within the soft x-ray range, which is of particular importance for illumination devices in lithography systems. The EUV range contains the transition to non-transparency of all media for this electromagnetic radiation.

On account of this non-transparency, EUV reflectometers can be operated only in a vacuum (typically pressures less than $5 \cdot 10^{-6}$ mbar) and only with reflective optical elements. Moreover, the residual gas must not contain hydrocarbons since EUV radiation decomposes hydrocarbons, which are adsorbed on the surfaces of the optical elements in the beam guiding system and of the objects to be tested, and contaminate the surfaces with carbon layers.

It is known that the reflectivity of electromagnetic radiation is dependent both on the wavelength impinging on a reflective surface, and on the angle of incidence relative to the surface normal at the location of incidence. The reflectivity of an optical element, which is often also referred to as reflectance, results here from the ratio between the intensity of the reflected radiation and the intensity of the incident radiation. Spectral reflectometry involves measurement with a constant angle of incidence and a variable wavelength. Angle-dependent reflectometry involves tuning the angle of incidence of the radiation with a constant wavelength.

Measurements at various wavelengths in a specific wavelength range yield reflection spectra that can be used, inter alia, for characterizing the materials involved in the reflection and the structure of said materials. The same applies, mutatis mutandis, to angle spectra that can be detected with the aid of measurements at different angles of incidence. EUV reflectometers are suitable, inter alia, for examining reflective test objects, such as mirrors or masks, for example, which include a multiplicity of material layers as reflective coating. It is also possible to measure, for example, how minimal the reflectance is of absorbing materials that are provided on masks.

Mirrors having a multilayer system can be used for example in EUV microlithography with an operating wavelength of approximately 13.5 nm or approximately 6.8 nm. There is a need to measure the reflection properties and layer profiles of such mirrors with the highest possible accuracy.

Numerous influencing factors can adversely affect the measurement accuracy of an EUV reflectometer. By way of example, an excessively low spectral resolution can lead to blurring of the spectral reflection curve, thereby hampering evaluation and interpretation. A non-uniformly illuminated measurement spot and/or an excessively large measurement spot on the mirror surface can also cause measurement errors particularly in the case of mirrors having a curved surface.

Reflectometers for soft x-ray radiation (which includes the EUV range) are typically operated on the basis of synchrotron radiation sources and dedicated monochromator beam tubes. However, synchrotron radiation sources are major research devices that are complicated to operate and have limited availability, and so industrial quality assurance using EUV reflectometry necessitates the development of local compact EUV reflectometers, independently of synchrotron radiation sources.

One such local EUV reflectometer is described in the specialist article "A soft x-ray/EUV reflectometer based on a laser produced plasma source" by E. M. Gullikson et al. in: Journal of X-Ray Science and Technology, Volume 3, Issue 4 (1992), 283-299.

The specialist article "New laboratory EUV reflectometer for large optics using a laser plasma source" by L. van Loyen et al. in: Proc. of SPIE 5038 (2003) 12 describes a commercially available further development of this system. In that case, for illumination purposes, use is made of a laser plasma source with solid target and a monochromator beam tube with concave grating, slit and concave refocusing mirror for monochromatization and focusing in the dispersive plane and an additional concave mirror in the non-dispersive plane. The manipulator or the positioning device for mounting and positioning the test object comprises a main carrier, which is rotatable about a vertical rotation axis, and also an overlying horizontal linear displacement table. The runner of the displacement table carries a curved guide system, which carries a holding device for holding the test object and allows pivoting of the overlying mechanism about a horizontal pivoting axis parallel to the translation direction of the underlying displacement table. The pivoting table carries a further linear displacement table, the translation direction of which runs perpendicular to the pivoting axis and also horizontally, provided that pivoting does not take place. A rotary table is arranged on the runner of said displacement table, the rotation axis of said rotary table likewise being perpendicular to the pivoting axis and also horizontal, provided that pivoting does not take place. The rotary platform of said rotary table carries a holding device for the test object and the mount thereof. The positioning device enables both the scanning of the entire sample surface and corrections of position and orientation.

The specialist article "Characterization of the measurement uncertainty of a laboratory EUV reflectometer for large optics" by F. Scholze et al in: Meas. Sci. Technol. 18 (2007) 126-130 also describes this further development. These existing EUV reflectometers with a hydrocarbon-free vacuum system can be used to measure objects having a mass of up to 80 kg.

A press release dated Jan. 7, 2019, and available via the homepage of the applicant Bestec GmbH reports the construction of a particularly large reflectometer under the heading "Very large reflectometer under construction". A photograph with the caption "Soft X-Ray reflectometer" shows parts of the positioning device under construction.

The EUV reflectometer is designed for test objects having diameters of up to 1500 mm and weights of up to 800 kg.

DE 10 2018 205 163 A1 describes an EUV reflectometer. A positioning device, not illustrated in more specific detail, holds the test object and enables translation and rotation of the test object to be measured in all three spatial directions in order to be able to carry out reflectivity measurements depending on the wavelength and on the angle of incidence at different measurement locations. A photodiode that is sensitive to EUV radiation serves as a detector for detecting the intensity of the EUV radiation reflected by the mirror surface.

In the field of semiconductor fabrication utilizing EUV lithography, the requirements made of the optical systems used for this purpose are becoming more and more stringent in accordance with the "Roadmap" of the semiconductor manufacturers. With the demand for ever higher resolution and associated demands for higher values for the image-side numerical aperture NA, the structural size of the optical systems used for lithography is increasing. At the same time the specifications for example for the location-dependent and angle-dependent reflectivity are becoming more and more demanding. Accordingly, this also results in a need for further improvements for increasing the measurement accuracy of EUV reflectometers. This concerns in particular the absolute accuracy of the pose of the object to be tested and the repetition accuracy of the reflectivity measurements. The term "pose" or spatial location here denotes the combination of position and orientation of an object. These aims are intended to be achieved as far as possible without an excessive increase in the overall size and complexity of the systems used for the measurement.

SUMMARY

Against this background, the invention addresses the problem of providing an EUV reflectometer of the type mentioned in the introduction which, in comparison with the prior art, allows objects having multiply, e.g., up to ten times, higher mass to be measured in a shorter time and offers an increased measurement accuracy in this case. This aim is preferably intended to be achieved without an excessive increase in the complexity and structural size of the EUV reflectometer.

To address this problem, the invention provides an EUV reflectometer having the features described and claimed hereinbelow, including in the independent claims. Preferred developments are also described and are specified in the dependent claims. The wording of all claims is incorporated by reference in the content of the description.

The EUV reflectometer in accordance with one formulation of the claimed invention is configured for measuring the reflectivity of a test object having a reflective effect for EUV radiation, depending on the wavelength of the EUV radiation and on the angle of incidence of the EUV radiation on a reflective surface of the test object. It is thus possible to measure the reflectivity depending on the wavelength and, alternatively or additionally, also the reflectivity depending on the angle of incidence.

The EUV reflectometer comprises an EUV radiation source configured for emitting EUV radiation. A beam shaping unit disposed downstream serves for receiving EUV radiation from the EUV radiation source and for generating a substantially monochromatic measurement beam. Furthermore, the EUV reflectometer comprises a positioning device for holding the test object and for positioning the test object in relation to the measurement beam in a plurality of degrees of freedom in such a way that, during operation of the EUV reflectometer, the measurement beam impinges on the reflective surface at a predefinable measurement location in the region of a measurement spot at a predefinable angle of incidence or a predefinable angle of incidence range. It is thus possible to determine the reflectivity in the region of the measurement spot.

A detector that is sensitive to EUV radiation is configured for detecting that EUV radiation which is reflected by the reflective surface of the test object.

The positioning device is designed in particular with regard to satisfying the particular test objective of EUV reflectometry and the boundary conditions thereof.

Since EUV radiation is absorbed by air, not only the optical components of the beam shaping unit but also components of the positioning device must be arranged within an evacuable vacuum chamber. The positioning device must enable translations and rotations of the test object in relation to all three spatial directions. For this purpose, a positioning device generally has a multiplicity of actuators which bring about the required movements for setting the respectively desired position and orientation of the test object. For practical reasons, the actuators are also accommodated in the vacuum chamber. The drive components must be grease-free on account of the particular boundary conditions of arrangement in the vacuum chamber.

It would be possible, for example, for all movements required for the positioning of a test object to be realized by stepper motors in a vacuum. The inventors have now recognized a hitherto unappreciated problem connected inter alia with the increasing structural size and the increasing weight of certain optical components for EUV systems. The more and more stringent requirements in respect of imaging quality and resolution have the effect, inter alia, that, in comparison with earlier designs, some optical components have to have a significantly larger structural size (e.g. diameters of up to one meter or more, thicknesses of up to a few hundred millimeters) and accordingly also a significantly greater weight. Weights of several hundred kilograms are not unusual. It has been recognized that, as a result, there is the risk that previous concepts regarding motor torque, motor heat dissipation, loading of grease-free bearings and guides may possibly no longer satisfy the increased requirements in the future. In view of this problem situation, inter alia, this application presents a new concept for a positioning device which can advantageously be utilized in association with a wide variety of beam shaping units as part of an EUV reflectometer.

Against the background of the requirements mentioned, in accordance with the insights of the inventors significant progress with regard to the accurate positioning of test objects, in particular test objects having a high weight in a vacuum, positioning can be achieved by virtue of the fact that the positioning device has a main carrier, which is rotatable about a vertical rotation axis and on which a parallel kinematic multi-axis system having a multiplicity of actuators is arranged, which act on a common platform, which is movable in six degrees of freedom (i.e., in three linear and three rotational degrees of freedom) in space by operation of the actuators, the platform carrying a holding device for holding the optical component and a rotary drive for rotating the holding device about a rotation axis.

In the context of this application, the term "actuator" denotes a drive-technological structural unit which, through operation of an assigned drive, converts an electrical signal originating from a controller into mechanical movements of components coupled to the actuator. An actuator within the meaning of this application is thus a drive assembly which does not belong to the moved object and the guide system thereof and which comprises at least one drive.

The use of a parallel kinematic multi-axis system for positioning a test object affords the possibility, inter alia, of using a high number of drives for the required movements of the test object, which drives can share the task of the test object movements and test object positioning such that each individual drive can be used nowhere near its power limit, with the result that possible heating of the actuators remains in a non-critical range. It should be noted here that the actuators are to be arranged in a vacuum, in which heat dissipation is generally considerably reduced in comparison with applications in air. Consequently, according to the insights of the inventors, a parallel kinematic multi-axis system having the possibility of using very many actuators or drives of actuators in a coordinated manner is particularly well adapted to the movements and positioning of heavy loads in a vacuum.

In this case, the main carrier is rotatable about a vertical rotation axis in a delimited manner via a rotary drive. In the case of this design, therefore, the entire parallel kinematic multi-axis system can change its orientation in space in relation to a vertical rotation axis. By virtue of this additional rotative machine axis, a possibly limited working range of the parallel kinematic multi-axis system is extended by a vertical rotation axis. This can facilitate e.g., the loading and unloading of the test object into and out of the vacuum system. Moreover, the additional rotation axis is advantageous in order to be able to completely cover a measurement angle range that is as large as possible.

In order to achieve an exact positioning and orientation of the test object for each measurement operation, the positioning device should satisfy stringent requirements in respect of the absolute accuracy. In this case, with regard to the positioning, as far as possible positioning accuracies of 100 μm (micrometers) or less should be attained. Absolute accuracies of the position of the order of magnitude of 50 μm or less, e.g., in the range of 30 μm or less, would be particularly advantageous. Alternatively or additionally, it may be desirable to achieve, with regard to the orientation of the test object, angular accuracies or positional accuracies in the range of 0.01° or less, in particular in the range of 0.005° or less.

The inventors have recognized that the increased requirements in respect of the absolute accuracy of the positioning device are not achieved, or are not achieved systematically enough, if, on account of the high loads and the restricted structural space, load-dependent deformations should be expected in the system including at components on the output side beyond the encoders. In most cases, mechanical deformations exhibit a hysteresis that is dependent on the load, the pose and on the movement range, and so for such a system, even after calibration, the absolute accuracy would be limited by the differences in the hysteresis.

In view of these problems, inter alia, the claimed invention provides a measuring system for determining in situ the location and position of the test object in space in all six degrees of freedom, said measuring system being independent of the drives of the actuators of the positioning device. The measuring system is assigned to the positioning device, i.e., cooperates with the positioning system. In other words, the spatial location or the pose of the test object, i.e., the combination of positions and orientation of the test object, is detected load-independently with the aid of the separate measuring system. The measurement results of the independent measuring system are transmitted to the controller of the positioning device and processed for the purpose of exactly setting the spatial location of the test object. The independent measuring system can be regarded as a functional extension of the positioning device. It supplies information detected in addition to the information from encoders of the actuators and independently thereof. The measuring system enables a load-independent and in this respect "objective" view of the pose of the test object and/or of the holding device. This information is taken into account in the control of the positioning device.

If a positioning device of the type described here that already operates extremely precisely per se is controlled using measurement results or measurement signals of a load-independently operating measuring system, then the sought accuracies of the pose to be set can be achieved reliably and repeatably for different loads, in particular even in the case of very heavy test objects.

The independent measuring system, preferably installed in a positionally fixed fashion, can operate electromechanically. The measuring system can have a measuring arm configured as an articulated arm, for example, which is coupled at one end fixedly to a space-fixed fixed point and at the other end to the test object or the holding device for the test object, the articulated arm being equipped with measuring units in order to detect the relative location of the engagement point on the test object or on the holding device for the test object with respect to the space-fixed fixed point. By way of example, length interferometers and/or inclinometers and/or distance sensors and/or other encoders can be used in the measuring units of the measuring arm.

An independent measuring system that operates without contact is currently preferred. In accordance with one embodiment, the independent measuring system is designed as an optical measuring system. By way of example, the measuring system can be designed for carrying out an optical triangulation. The measuring system can have two, three or more cameras, for example, which are aligned or alignable with reference marks attached directly on the test object and/or on the holding device for the test object. The image signals of the cameras can be processed jointly e.g., for the purpose of triangulation or some other evaluation method. In this case, the cameras can be mounted as in-vacuum cameras within the vacuum chamber. They can also be situated outside the vacuum and be directed at the test object and/or the holding device for the test object by way of correspondingly fitted flanges or through viewing windows.

One preferred optical measuring system is specifically adapted to the test objectives that are typical here, namely determining in situ all six degrees of freedom of a possibly very large and heavy measurement object or of a test object or of the holding device thereof in a vacuum over a relatively large distance, for example of up to 3 m or more, in a large measurement range, for example of the order of magnitude of 1 m or more, and for angular differences of up to 360°.

Under these conditions, the acceptance angle required for detecting the test object in a conventional camera can become so large that significant distortions can occur in the outer field of view of the images. These can adversely affect the measurement accuracy. For this reason, inter alia, in one preferred measuring system, provision is made for the cameras to be embodied as pinhole cameras having a pinhole stop, or a hole, facing the positioning device and a two-dimensional image sensor fitted at a distance behind the hole. Dispensing with an optical lens allows distortions caused thereby to be avoided, and so in this respect geometrically exact image representations are possible even at high acceptance angles. Preferably, a fixed pinhole stop is used; an adjustment of the hole size is neither necessary nor desired.

In order to reproduce the conditions of geometric optics as exactly as possible with this measuring arrangement, provision is preferably made for viewing windows designed as transparent film windows having a thickness in the micrometers range. The thickness can be e.g., between 2 µm and 10 µm. As a result, there is only a negligibly small beam offset in the case of oblique light passage.

A further contribution to increasing the measurement accuracy can be achieved by the measuring system having actively luminous reference marks, in particular in the form of light-emitting diodes (LEDs). The test object and/or the holding device can be equipped with vacuum-compatible LEDs with sufficient light power and also with fixed and known relative arrangement with respect to one another.

In particular, the measuring system can be designed such that the following conditions are satisfied:
(i) there are at least two pinhole cameras which are arranged at a fixed angle with respect to one another with in each case a fixed distance between the pinhole stop and the image sensor in such a way with respect to one another that in each case at least three common reference marks are situated at constant distances with respect to one another in the capture region of the pinhole cameras;
(ii) the diameter of the pinhole stop, a distance between the pinhole stop and the image sensor and also the spatial density of pixels of the image sensor are designed in such a way that the full width at half maximum of an image of a reference element imaged via the pinhole stop on the image sensor has a magnitude such that the image covers a multiplicity of pixels of the image sensor, in particular an area of at least 10×10 pixels.

The evaluation device can then be configured to carry out an image evaluation using the effect of super-resolution. For this purpose, e.g., the position of the geometric centroid of an intensity distribution in the image of a reference mark can be determined with an accuracy of typically less than one tenth of a pixel, e.g., approximately 0.02 pixel.

It has been found that as a result, depending on the object distance, spatial resolutions in the range of less than 10 µm, in particular in the range of 3 µm to 8 µm, and/or absolute accuracies in the range of less than 50 µm, in particular around approximately 30 µm, are achievable. As a result, inter alia, the absolute accuracy of the determination of the pose of the object to be tested can be improved in comparison with conventional solutions.

An independent optical measuring system of the type described here can also be used advantageously in combination with differently constructed positioning devices, in particular those of the prior art cited, such that the optical measuring system and respective embodiments thereof are regarded as independent inventions.

There are various possibilities for the configurations of the positioning device.

The positioning device can have for example a parallel kinematic multi-axis system in the manner of a Stewart-Gough manipulator (referred to as: Stewart platform), which allows mobility of the platform in all six degrees of freedom. The parallel kinematic multi-axis system can be designed e.g., as a so-called "hexapod". A traditional hexapod is a special form of a parallel kinematic machine that has six legs of variable length.

However, an alternative configuration is currently regarded as advantageous. In one development, the parallel kinematic multi-axis system has a tripod arrangement having exactly three legs, each of which is movably coupled to the main carrier through a first joint arrangement at a first end facing the main carrier, and to the platform through a second joint arrangement at a second end facing the platform. This design can provide mobility of the components carried by the platform in all six degrees of freedom.

The legs of the tripod arrangement preferably do not have a variable length, but rather a fixed length, and can accordingly be designed to be very stable with regard to carrying heavy loads.

Preferably, provision is made for the first joint arrangement to have a joint that is rotatable in a plurality of axes, for example a ball-and-socket joint or a cardan joint arranged on a rotary bearing, which joint is coupled to a slide, which is movable in a reference plane in two mutually perpendicular directions. The first joint arrangement can have e.g., an assembly in the manner of a compound table, i.e., a two-axis system having two mutually orthogonal single-axis linear guide systems with associated slides in order to move the joint that is movable in a plurality of axes in any desired directions within a reference plane. This assembly is combined with the joint that is preferably rotatable about three rotation axes, such that the first end of the legs facing the main carrier and the joint provided thereon can be moved to different locations in the reference plane or be positioned there in a controlled manner.

The platform-side second joint arrangement can be configured relatively simply by comparison therewith, in particular in the form of a single-axis rotary joint or a pivoting joint, which enables the leg to be pivoted relative to the platform about a pivoting axis running transversely with respect to the extent of the leg.

Particularly during rapid and exact positioning of relatively heavy test objects, such as, for example, mirrors for optical systems in EUV lithography, in a vacuum, conventional concepts of manipulators may reach their limits, for example because wear resulting from abrasion becomes disproportionately high and/or the required forces and moments cannot be applied well enough. In some embodiments, a contribution to avoiding such problems is achieved by virtue of the fact that drives and guide systems of the tripod arrangement are designed in such a way that maximally effective forces on drives, slides and guides are distributed on average in similar proportions between axial and non-axial directions. The term "axial direction" here denotes the movement direction of a slide along a linear guide system. The forces can be distributed in particular approximately in equal portions between axial and non-axial directions. What can be achieved, inter alia, as a result is that the loading of the drives that are effective in an axial direction is relieved by transverse force components being permitted on account of the design, which force components can be absorbed well by the guide systems designed generally in a stable fashion.

In one embodiment, this advantageous distribution of forces is achieved by virtue of the fact that the second joint arrangement is embodied as a single-axis pivoting joint, which enables the leg to be pivoted relative to the platform about a pivoting axis running transversely with respect to the extent of the leg in such a way that an end of the leg facing the first joint arrangement is displaced upon pivoting of the leg about the pivoting axis in the reference plane in a displacement direction, and that the first joint arrangement has orthogonally crossed slides with movement directions running obliquely, in particular at an angle of 45°, with respect to the displacement direction.

In some embodiments, a further contribution with regard to rapid and exact positioning while lowering the burden on drives is achieved by virtue of the fact that some or all of the drives, for producing a rectilinear linear movement of a driven component, have a trapezoidal threaded spindle, which is rotatably driveable by the drive and on which runs a spindle nut coupled to the component. By way of example, ball roller spindles can also be used in the drive system. With the aid of trapezoidal threaded spindles, however, even higher loads can be safely moved; moreover, for the same loads they require significantly less structural space than other concepts and can be exchanged more easily in the case of maintenance.

In one preferred embodiment, a particular contribution to reducing the heat dissipation at the drives of the actuators is achieved by virtue of the fact that in the case of at least one translational movement axis, provision is made of two separate drive motors for jointly moving the movement axis. An electromechanical movement system of a geometric axis of the positioning device is thus provided, wherein two separate drive motors move a common drive axis. In the field of machine tools, similar drive concepts for a different purpose are known by the designation "gantry drive". This concept thus deliberately uses more drive motors than would be necessary for a simple linear movement of an axis. Advantageously, a reduced loading of the individual drives and thus less generation of heat are achieved, as a result of which this drive concept is particularly well adapted to application in the vacuum chamber of an EUV reflectometer.

In some embodiments, provision is made for the two drive motors to form a parallel drive and for the parallel drive to have a shaft for the active correction of a shaft orientation. Although a non-tactile shaft is possible, the two drivetrains are preferably mechanically coupled in a force-transmitting manner via a mechanical shaft physically present. Preferably, the shaft is encoded, i.e., has at least one sensor or encoder that can detect e.g., the loading state and/or the orientation of the shaft. The encoded shaft can be used to detect metrologically whether one of the drives or the component driven thereby is disadvantageously leading or lagging behind a component driven by the other drive. Such unequal advances are detected with the aid of the shaft, and converted into signals with an encoder, and the signals are used to control the drives unequally in a phasewise manner so that the leading or lagging is at least partly compensated for. As a result, inhibiting forces caused by inequalities can be avoided or reduced.

As a further measure, alternatively or additionally, provision can be made for each leg of the tripod arrangement to be assigned a spring arrangement having one or more springs, the spring arrangement acting on the leg at one end and on the platform at the other end. Given appropriate design of the spring forces, a prestress of the parallel kinematic assembly can be set such that for each pose the forces acting can be considerably reduced, for example by up to approximately 50%, and even by 100% in the case of a zero crossing. Springs can thus be provided for the compensation of axial forces at the drive slides of the tripod arrangement.

The base frame of the positioning device could be mounted in a housing-fixed manner in the bottom region of the vacuum chamber, for example. Preferably, however, provision is made for the base frame to be mounted in a manner mechanically decoupled from components of the vacuum chamber. Preferably, a plurality of adjusting feet are fitted to the underside of the base frame in order to install the base frame directly on the floor of a hall, the adjusting feet reaching through openings in the baseplate of the vacuum chamber without touching contact with the chamber wall and being mechanically decoupled from the baseplate by vacuum-tight decoupling devices. As a result, possibly disadvantageous vibratory, thermal and/or mechanical influences of the vacuum chamber on the measurement are reduced.

The beam shaping unit of preferred embodiments comprises a monochromator configured for setting the wavelength of the measurement beam. The monochromator comprises a concavely curved reflection grating and, disposed downstream of the reflection grating, a stop arrangement with an exit slit, the slit width of which is settable. A front reflection element is arranged in the beam path of the measurement beam upstream of the reflection grating. A back reflection element is arranged in the beam path downstream of the exit slit or the stop arrangement. The front reflection element, the reflection grating and the back reflection element lie optically one behind another in the beam path of the measurement beam. The latter, after passing through the exit slit, has the wavelength or wavelengths from a possibly relatively narrowly delimited wavelength range, desired for the measurement.

In accordance with one preferred embodiment, the front reflection element and the concavely curved reflection grating are embodied in combination with one another in such a way that in the region of the stop arrangement it is possible to produce a first intermediate focus in a first direction and a second intermediate focus in a second direction, perpendicular to the first direction. The stop arrangement has a first exit slit having a first slit width, which is settable in the first direction, and a second exit slit having a second slit width, which is settable in the second direction.

In accordance with another formulation, the stop arrangement has a rectangular stop opening, the clear width of which can be adjusted in two mutually perpendicular directions independently of one another. In this application, such a stop arrangement is also referred to as a two-dimensionally adjustable rectangular stop.

The set-up can also be described such that the front reflection element and the reflection grating are part of a first subsystem of the beam shaping unit, said first subsystem achieving an intermediate imaging that is effective in two orthogonal planes. The resulting intermediate focus lies in the region of a stop opening of the stop arrangement and can be delimited in two mutually perpendicular directions with a settable slit width.

The back reflection element disposed downstream of the stop arrangement is part of a second subsystem, which has a refocusing effect and images the region of the intermediate focus into the region of the measurement spot.

The introduction of the intermediate focus enables performance to be improved, inter alia for the following reasons. Firstly, the intensity distribution in the source spot does not correspond to the desired distribution at the focus, and so an improved virtual source spot for the refocusing mirror is created at the intermediate focus by way of suitable apertures. Secondly, it should be noted that the source used emits isotropically and as much acceptance as possible is sought in order to "trap" a maximum proportion of the emitted radiation and thereby to minimize intensity losses. The divergence at the test object is intended to be as small as possible in a horizontal direction, since otherwise the resolution of the angular spectra of the reflectometer would be limited. In this case, the term "divergence" denotes the angular bandwidth of the measurement beam and thus determines the angle of incidence range from which the rays of the measurement beam in the region of the measurement spot are incident on the surface to be measured. Since the divergence in a horizontal direction is thus intended to be small, high acceptance in a vertical direction is chosen, although this increases the imaging aberrations. This is also applicable, moreover, with the use of elliptical mirrors as a result of manufacturing faults and alignment errors. The trimming of the virtual source spot by the aperture at the intermediate focus is also advantageous for reducing imaging aberrations. In this case, the aperture trims away only relatively little intensity, thus resulting overall in a positive total balance of this measure.

In other words: an intermediate imaging is produced in such a way that with the aid of the crossed exit slits of the stop arrangement, both the beam size of the measurement beam and the beam profile in the region of the measurement spot can be set by way of the settable exit slits.

In addition, with the aid of the novel arrangement it is possible to achieve increased accuracy requirements e.g., in the range of 99.9% or more with regard to reflectance. In other words, measurements can be carried out systematically so that the measured value determined deviates from the true value of the reflectivity by a maximum of 0.1%.

There are various possibilities for achieving the effect that the first subsystem containing the front reflection element and the reflection grating brings about an intermediate imaging in two mutually perpendicular planes or directions. A development that manages without increasing the number of optical elements of the beam shaping unit provides for the reflection grating of the monochromator to be embodied as a reflection grating having a variable line spacing. This type of grating is also referred to here as a VLS grating, where VLS stands for "variable line spacing". A VLS grating also allows the location of the intermediate focus to be chosen freely within certain limits.

Grazing incidence gratings generally produce good focusing (and thus a good wavelength selection or a good narrowband characteristic) only for one wavelength. With a longer focal length, the error of the wavelength dependence of the resolution is usually acceptable. However, if a shorter focal length is desired for reasons of a limited structural space, for example, wavelength-dependent errors of the resolution can become apparent in the sense that the measurement beam still contains disturbing radiation components of adjacent wavelengths in addition to the radiation of the desired wavelength. Using a suitably designed the LS grating makes it possible to counteract the deterioration in resolution as the focal length is shortened.

In this case, the line spacing between the grating lines and/or the groove shape are/is preferably varied over the effective reflective surface such that, under otherwise identical conditions, the reflection grating offers an improved resolution with a shorter focal length than in the case of a constant line spacing. The line spacing is preferably varied in such a way that the line spacing continuously decreases from the entrance side (nearer to the front reflection element) to the exit side (nearer to the stop arrangement) if positive first order is employed (and vice versa). To put it another way, the line density is increased in the beam direction (if the negative first order is used). The line density is thus higher in the direction of the monochromator slit.

In particular, it may be the case that the reflection grating of the monochromator configured with variable line spacing, i.e., the VLS grating, has a meridionally cylindrical curvature. In this context, the term "meridionally" means that the plane of the curvature runs substantially parallel or at an acute angle with respect to the plane of incidence.

The second subsystem lying between the stop arrangement having the exit slits, on the one hand, and the measurement spot, on the other hand, serves for refocusing the intensity distribution present in the region of the intermediate focus or in the region of the rectangular stop opening into the region of the measurement spot.

In one preferred development, provision is made for the back reflection element to be embodied as an ellipsoidal reflection element having a first curvature in a first direction and a second curvature in a second direction perpendicular thereto, i.e., as a two-dimensionally concavely curved reflection element. The back reflection element can thus be fashioned such that it has a refocusing effect in two mutually orthogonal planes. It is thus possible to dispense with a further reflection element in the second subsystem, such that preferably only a single reflection element having a bidirectionally curved reflection surface is present between the stop arrangement and the measurement spot. This affords advantages with regard to the axial structural size, which can remain compact with the use of only one optical element. Secondly, it is thereby possible to avoid intensity losses that would be caused by the insertion of a further optical element, with the result that the measurement spot can be illuminated with relatively high intensity. This can contribute to the measurement accuracy.

Preferably, the beam shaping unit thus has exactly three reflection elements having curved reflective surfaces, namely a first reflection element, the concavely curved reflection grating disposed downstream thereof, and the back reflection element arranged between stop arrangement and measurement spot.

There are various possibilities for the embodiment of the front reflection element. In one exemplary embodiment, the front reflection element is embodied as a sagittally plano-cylindrical reflection element. The term "plano-cylindrical reflection element" here denotes a reflection element whose reflective surface extends in a curved fashion in the shape of a cylindrical surface in one direction and in a rectilinear or plane fashion in a direction substantially perpendicular thereto, such that the reflective optical surface of a plano-cylindrical reflection element is a part of a lateral surface of a circular cylinder. Besides the shape of the reflective surface, the orientation thereof relative to the measurement beam is also crucial for the optical effect. In the context of this application, the term "sagittally" means that the curvature of the reflective surface runs in a plane that is substantially perpendicular to the plane of incidence of the principal ray of the measurement beam on the reflective surface.

In an alternative embodiment, the front reflection element is embodied as a concave, plano-elliptical front reflection element. The term plano-elliptical reflection element denotes a reflection element whose reflective optical surface extends in the shape of an ellipse in one direction and in a plane or rectilinear or uncurved fashion in a direction substantially perpendicular thereto.

The EUV reflectometer is intended to be able to determine the reflectance of a reflective surface or the reflectivity thereof in the EUV range. In accordance with one development, for this purpose, provision is made of a reference detector and a beam splitter for coupling out a portion of the EUV radiation of the measurement beam to the reference detector. The reference detector can be configured for detecting the intensity of the incident EUV radiation just like the detector for detecting the EUV radiation reflected by the reflective surface. A measure of the intensity of the measurement beam incident on the measurement spot can be determined from the measured values of the reference detector. The measurement system can thus be configured for determining a reflectance on the basis of the detected intensity of the incident measurement beam (with the reference detector) and the detected intensity of the reflected radiation (with the detector).

The beam splitter can have a mirror, for example, which detects a part of the EUV measurement beam at the margin of the measurement beam and reflects this portion in the direction of the reference detector. Alternatively, a curved beam splitter comb as beam splitter would also be possible, e.g., in order to achieve good focusing on the reference detector and not to overexpose the latter.

The concept proposed here allows good compromises between attainable measurement accuracy, structural space requirement in the general beam passage direction of the measurement beam and also adaptation to downstream units of the EUV reflectometer. In preferred embodiments, the components are designed such that a ratio between image distance and object distance of a first optical subsystem having the front reflection element and the reflection grating is less than 3, in particular less than 2, and that of a second subsystem having the back reflection element is less than 7. In the inventors' experience, it is thereby possible to attain a particularly good compromise between the required size of the measurement spot at the test object ("spot size"), on the one hand, and the acceptance or the input aperture for the divergent source radiation, on the other hand. If the input aperture is relatively large, then a correspondingly relatively large portion of the source radiation can be detected by the beam shaping unit on the input side and be used for the measurement. If the intensity level within the measurement beam in the region of the measurement spot is relatively high, then error sources that may adversely affect the measurement accuracy are possibly less significant. On the other hand, in the region of the exit side of the beam shaping unit, the measurement beam should be fashioned such that the measurement radiation is incident on the measurement spot from a relatively narrow angular range, thereby enabling in particular angle-resolved measurements with high precision. In addition, it should be taken into consideration that the test object must be held within an evacuable vacuum chamber for the measurement, and so the measurement spot should not be generated too near to the optical components of the beam shaping unit. The preferred design of the ratios between image distance and object distance is regarded as a good compromise with respect to these diverse boundary conditions.

BRIEF DESCRIPTION OF THE DRAWINGS

Further advantages and aspects of the invention are evident from the claims and from the following description of preferred exemplary embodiments of the invention which are explained below with reference to the figures.

FIG. 6 schematically shows one exemplary embodiment with a positionally fixed tactile measuring system with an articulated arm, said measuring system operating independently of the positioning device;

FIG. 7 schematically shows one exemplary embodiment with a positionally fixed optical measuring system with a plurality of cameras directed at reference marks, said measuring system operating independently of the positioning device;

DETAILED DESCRIPTION

In the exemplary embodiments or embodiments or embodiment variants described below, elements that are functionally or structurally similar to one another are designated in part by the same or similar reference signs. As a result, in order to afford a better understanding, in the case of features of the individual elements of one specific exemplary embodiment, reference may also be made, if appropriate, to the description of other exemplary embodiments or the general description of the invention.

Relative positions of optical components or optical elements are described in part using prepositions such as "between", "upstream", "downstream" or the like. Unless indicated otherwise, these prepositions relate to optical positions along an optical beam path. Designations such as "first", "second", etc. are used exclusively for unambiguous identification of the corresponding elements and generally do not describe an order.

Figure 1A:
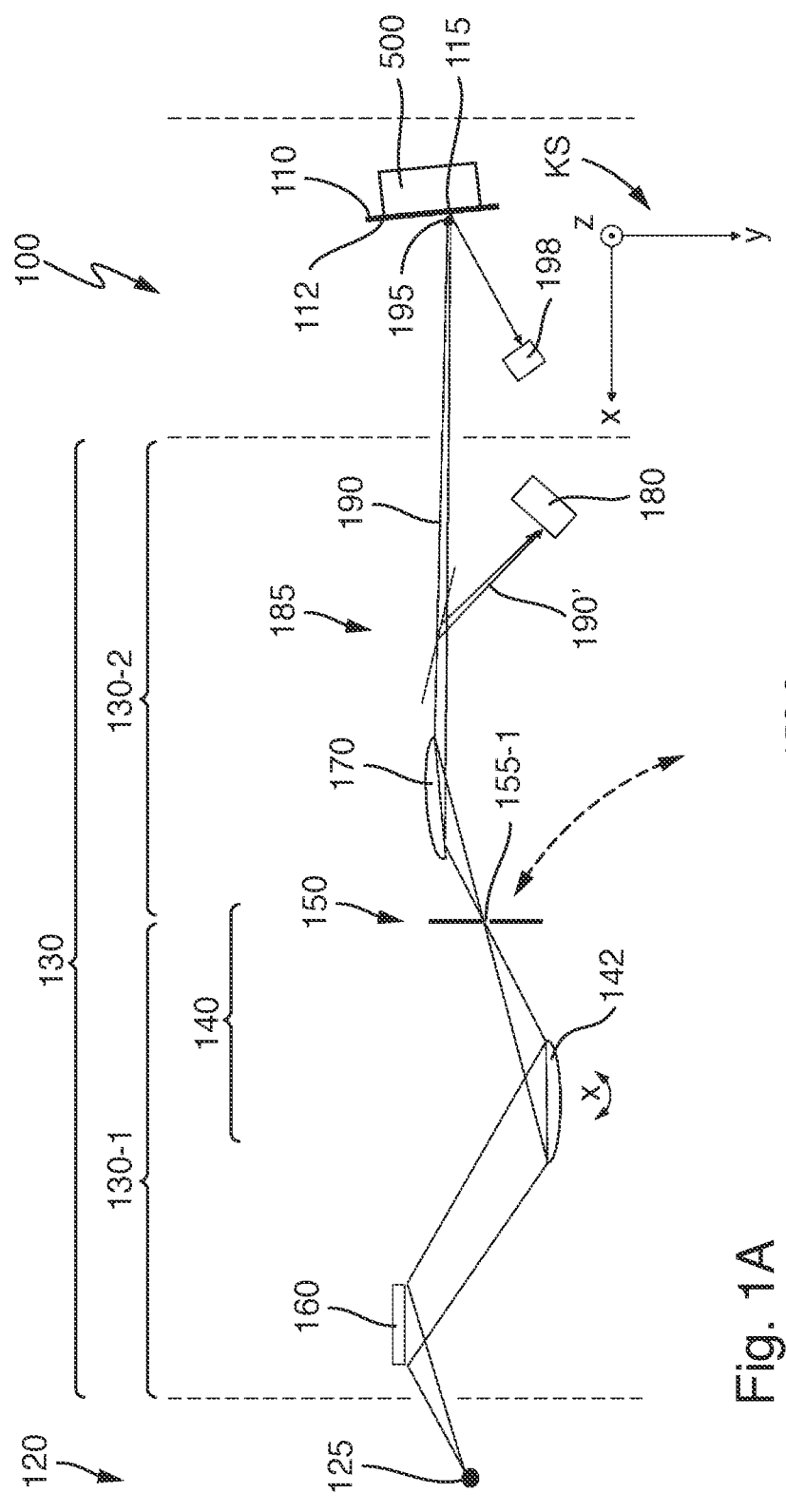
FIG. 1A shows a schematic plan view of components of an EUV reflectometer in accordance with a first exemplary embodiment illustrated in an x-y-plane.
Figure 1B:
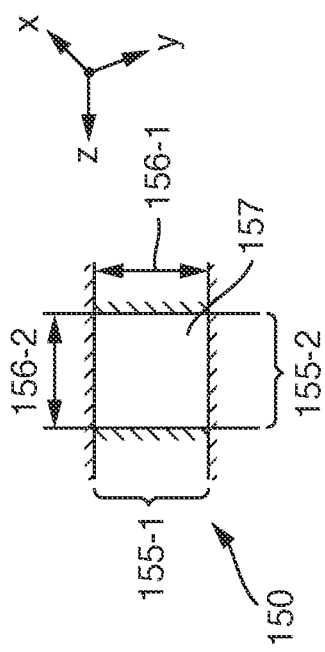
FIG. 1B shows a view of a stop arrangement having a rectangular stop opening that is used in the exemplary embodiment.

A right-handed Cartesian xyz-coordinate system KS is indicated in FIGS. 1A to 4, which reveals directly or approximately the respective positional relationships of the components illustrated in the figures. By way of example, in FIG. 1, the x-direction runs toward the left, the y-direction runs downward, and the z-direction runs perpendicular to and out of the plane of the drawing, such that the plan view in FIG. 1 represents an illustration in the x-y-plane. In one preferred arrangement in space, the x-y-plane is a horizontal plane.

FIG. 1A shows, in a greatly simplified manner, components of a first exemplary embodiment of an EUV reflectometer 100 or of a measurement system 100 for measuring the reflectivity of a test object 110 having a reflective effect for EUV radiation, depending on the wavelength of the EUV radiation and on the angle of incidence of the EUV radiation on a reflective surface 112 of the test object 110.

The test object can be for example a mirror for an EUV lithography lens, which mirror has a generally concavely or convexly curved reflective surface 112. The reflective surface can be spherically or rotationally symmetrically aspherically curved or can be fashioned as a freeform surface without rotational symmetry.

The EUV reflectometer allows, inter alia, measurement of the reflectance of the test object at different wavelengths in a predefined wavelength range of extreme ultraviolet (EUV) radiation. This is taken to mean here preferably wavelengths in the range of 6 nm to 20 nm, in particular of 8 nm to 20 nm.

In this case, the reflectance results from the ratio between the intensity of the reflected radiation measured with the aid of a detector 198 (e.g., photodiode) and the intensity of the incident radiation, the magnitude of which can be determined with the aid of signals of a reference detector 180. The predefined wavelength range can extend for example from approximately 6 nm to approximate 20 nm.

The measurements can be carried out for angles of incidence in the range of between 0° and 90° (without the limit values), in which case, owing to the dictates of the design, no measured values are detectable for normal incidence of radiation (angle of incidence) 0° and incidence of radiation running parallel to the surface (angle of incidence) 90°.

The EUV reflectometer configured ready for operation includes an EUV radiation source 120, which in the exemplary embodiment comprises a pulsed laser, the laser beam of which is focused onto a gold target or some other suitable material by a focusing optical unit (not illustrated). The laser beam produces a plasma at the surface of the target, which plasma emits a quasi-continuous spectrum of electromagnetic radiation in the EUV range. The plasma forms a source spot or emission spot 125, which emits the EUV radiation. Such a plasma beam source is also referred to as an LPP source, where LPP stands for "laser produced plasma". Alternatively, it is also possible to use other EUV radiation sources which emit a discrete or quasi-continuous spectrum of electromagnetic radiation in the EUV range, for example a DPP source. Here "DPP" stands for "discharge produced plasma".

A portion of the EUV radiation emitted by the source spot 125 passes through an input stop (not illustrated) of a beam shaping unit 130 configured to receive the EUV radiation from the EUV radiation source 120 and to generate therefrom a measurement beam 190, which, during operation of the measurement system 100, at the end where the test object is situated, is incident on the reflective surface 112 of the test object 110 and forms a measurement spot 195 there at an envisaged measurement place or an envisaged measurement location 115. The measurement spot is the region illuminated by the measurement beam on the surface of the test object and often has a diameter of an order of magnitude of 0.5 mm. The size relationship between source spot 125 and measurement spot 195 is essentially determined by the imaging scale of the beam shaping unit 130. The latter preferably has a magnifying effect, e.g., on a scale of 1:10. Other magnifications are also possible, e.g., in the range of 5 to 15.

For the purpose of setting the wavelength of the measurement beam 190 that is used for the measurement, the beam shaping unit 130 comprises a monochromator 140 designed as a grating monochromator or dispersive monochromator. The monochromator 140 comprises a concavely curved reflection grating 142 and a stop arrangement 150 disposed downstream of the reflection grating. The stop arrangement 150, shown in a different view in FIG. 1B, has a first exit slit 155-1, whose slit width (first slit width 156-1) is settable in a continuously variable manner. In a departure from the schematic illustration in FIG. 1A, the plane in which the stop arrangement 150 lies is aligned substantially perpendicular to the principal ray direction of the measurement beam during passage through the stop opening.

The reflective surface of the reflection grating 142 that is provided with rectilinear grating lines is meridionally cylindrically curved. This means that the cylinder axis of the generating circular cylinder is oriented substantially perpendicular to the direction of incidence of the measurement beam 190. In the case of the example, the reflection grating has a curvature in the xy-plane, while it is planar in the zy-plane.

The reflection grating 142 is pivotable about a pivoting axis parallel to the cylinder axis, such that depending on the pivoting angle, diffracted radiation with different wavelengths passes to the first exit slit 155-1 and passes through the latter as a measurement beam of defined wavelength to the test object.

The concavely curved reflection grating is designed as a VLS grating, i.e., as a grating having a variable line spacing or having a variable line density. The variation of the line spacings over the used surface region is designed such that even with a short spacing with respect to the downstream exit slit, it is possible to achieve a high spectral resolution of the measurement beam at different wavelengths sought. As shown schematically in FIGS. 2 and 4, for this purpose the line density increases continuously from the entrance side at the front to the exit side at the back, which is advantageous for a use of the negative first order.

Figure 2:
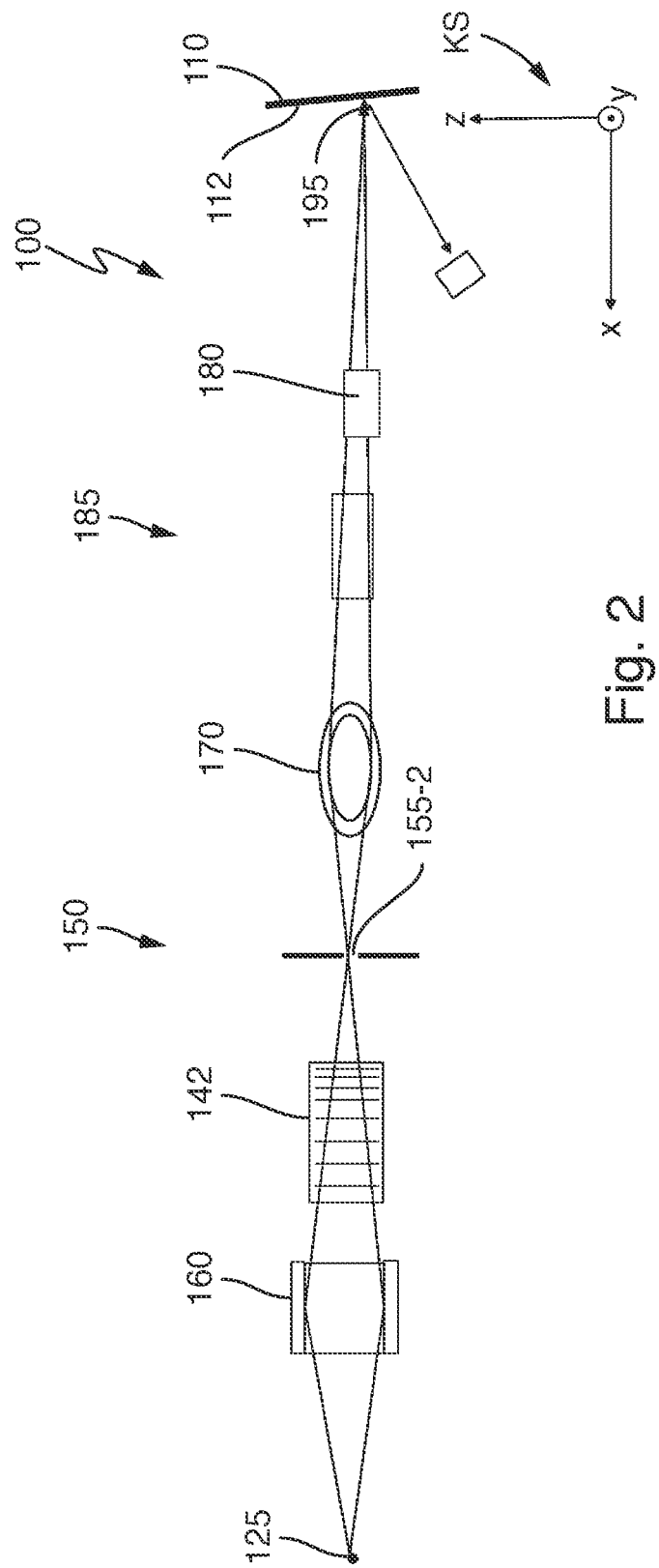
FIG. 2 shows a schematic side view of the exemplary embodiment from FIG. 1 illustrated in an x-z-plane.

A front reflection element 160 is arranged in the beam path upstream of the reflection grating 142, i.e., between the source spot 125 and the reflection grating 142. Said front reflection element directly receives the divergent EUV radiation coming from the source spot 125 and reflects it in the direction of the reflection grating 142. The front reflection element 160 is designed as a sagittally plano-cylindrical reflection element. The concavely cylindrically curved reflection surface is non-curved or planar in relation to the x-y-plane, and so a line of intersection between the reflection surface and the y-x-plane produces a straight line. In a direction perpendicular to the plane of incidence or transversely with respect to the plane of incidence, the reflection surface is concavely cylindrically curved. As a result, the front reflection element 160 has a focusing effect in the x-z-plane, oriented vertically in the case of the example, as illustrated in FIG. 2. The uncurved direction can run substantially parallel to the x-direction, as illustrated schematically in FIG. 1. Preferably, however, this non-curved direction is inclined by approximately 10° to 20° relative to the x-direction such that the EUV radiation coming from the source spot 125 is incident on the reflective surface at angles of incidence in the range of 70° to 80°, for example. As a result, it is possible to attain a good compromise between relatively high reflectivity of the front reflection element, on the one hand, and relatively compact structural length in the x-direction, on the other hand.

The front reflection element 160, together with the reflection grating 142 disposed directly downstream, forms a first subsystem 130-1 of the beam shaping unit 130. The first subsystem is designed such that in the region of the stop arrangement 150 it is possible to produce a first intermediate focus in a first direction (parallel to the y-direction) and a second intermediate focus in a second direction (parallel to the z-direction), perpendicular to the first direction. This is readily discernible with reference to FIGS. 1 and 2, where FIG. 1 shows the intermediate focus in the first direction and FIG. 2 shows the intermediate focus in the second direction in each case in the region of the stop arrangement 150.

In addition to the first exit slit 155-1, which extends with a uniform slit width substantially in the z-direction, the stop arrangement 150 has a second exit slit 155-2, which extends with a uniform slit width perpendicular thereto approximately in the y-direction and has a second slit width 156-2 measured in the z-direction, which is likewise settable in a continuously variable manner. The two exit slits lie one behind the other very closely (e.g., less than 1 mm) in the beam passage direction and thus act almost in a common plane. The stop arrangement 150 thus produces a rectangular stop opening 157 having a variably settable width and height (cf. FIG. 1B).

The first subsystem 130-1, consisting of the first reflection element 160 and the reflection grating 142, is thus an imaging subsystem that produces an intermediate imaging in two mutually perpendicular directions. The "intermediate image" of the source spot lying in the region of the stop opening can be delimited in two mutually perpendicular directions with the aid of the stop arrangement 150.

The beam shaping unit 130 furthermore comprises a back reflection element 170 arranged in the beam path between the stop arrangement 150 and the exit of the measurement beam 190 in the direction of the test object 110. In the case of the example, the back reflection element is the sole imaging reflective optical element of the second subsystem 130-2, which images the intensity distribution in the rectangular stop opening 157 onto the surface 112 of the test object. For this purpose, the back reflection element 170 is embodied as an ellipsoidal reflection element having a first curvature in a first direction (parallel to the z-direction) and a second curvature in a second direction (x-direction) perpendicular thereto; The curvatures are generally different. By virtue of the ellipsoidal shape of the reflection surface of the back reflection element 170, the latter has a refocusing effect in two mutually orthogonal directions, with the result that the intensity distribution in the region of the stop opening delimited by the exit slits is substantially regained in the region of the measurement spot 195.

In this exemplary embodiment, the extent of the region impinged on by EUV radiation in the region of the measurement spot 195 can thus be set continuously variably and in a sharply delimited manner in two mutually perpendicular directions with the aid of the stop arrangement 150.

The beam shaping unit 130 of the exemplary embodiment consists of a first subsystem 130-1, which produces an intermediate imaging of the source spot 125 in the region of the rectangular stop opening 157 of the stop arrangement 150, and also of a second subsystem 130-2, which is disposed downstream of the stop arrangement 150 and contains, as the sole imaging optical element, the back reflection element 170 embodied as an ellipsoidal reflection element and, in the region of the measurement spot, forms an approximate image of the illuminated region of the rectangular stop opening 157.

The beam shaping unit 130 thus has only three optical elements provided with curved reflection surfaces, as a result of which the light loss between source spot 125 and measurement spot 195 can be kept relatively low.

In order to be able to take account of unavoidable slight intensity fluctuations of the EUV radiation source during the detection and evaluation of the measurement results and to avoid measurement errors caused thereby, the EUV reflectometer comprises a reference detector 180 arranged outside the measurement beam path, and also a beam splitter 185, which serves to couple out one portion of the incident EUV radiation of the measurement beam to the reference detector 180 and to transmit another portion to the test object 110.

By virtue of the beam shaping-possible with the aid of the beam shaping unit—with intermediate imaging and adjustable slits in the x-direction and y-direction, both the beam profile of the EUV radiation in the region of the measurement spot and the measurement spot size on the reflective surface 112 of the test object 110 are settable by a user and can thereby be adapted to the measurement task.

The previously described components of the EUV reflectometer allow a continuously variable setting of the wavelength of the measurement beam 190 over a desired wavelength range with the aid of the integrated dispersive monochromator 140 comprising the reflection grating 142 in combination with the assigned exit slit.

The assembled EUV reflectometer of the exemplary embodiment that is ready for operation is additionally configured to set the measurement location on the surface of the test object, i.e., the position of the measurement location 115 on the reflective surface 112, and also the angle of incidence or the angle of incidence range of the measurement beam 190 at the measurement location in a continuously variable manner reproducibly with high accuracy. One preferred embodiment of a positioning device 500 that can be used for this purpose will be explained in greater detail later in association with FIG. 5.

Figure 3:
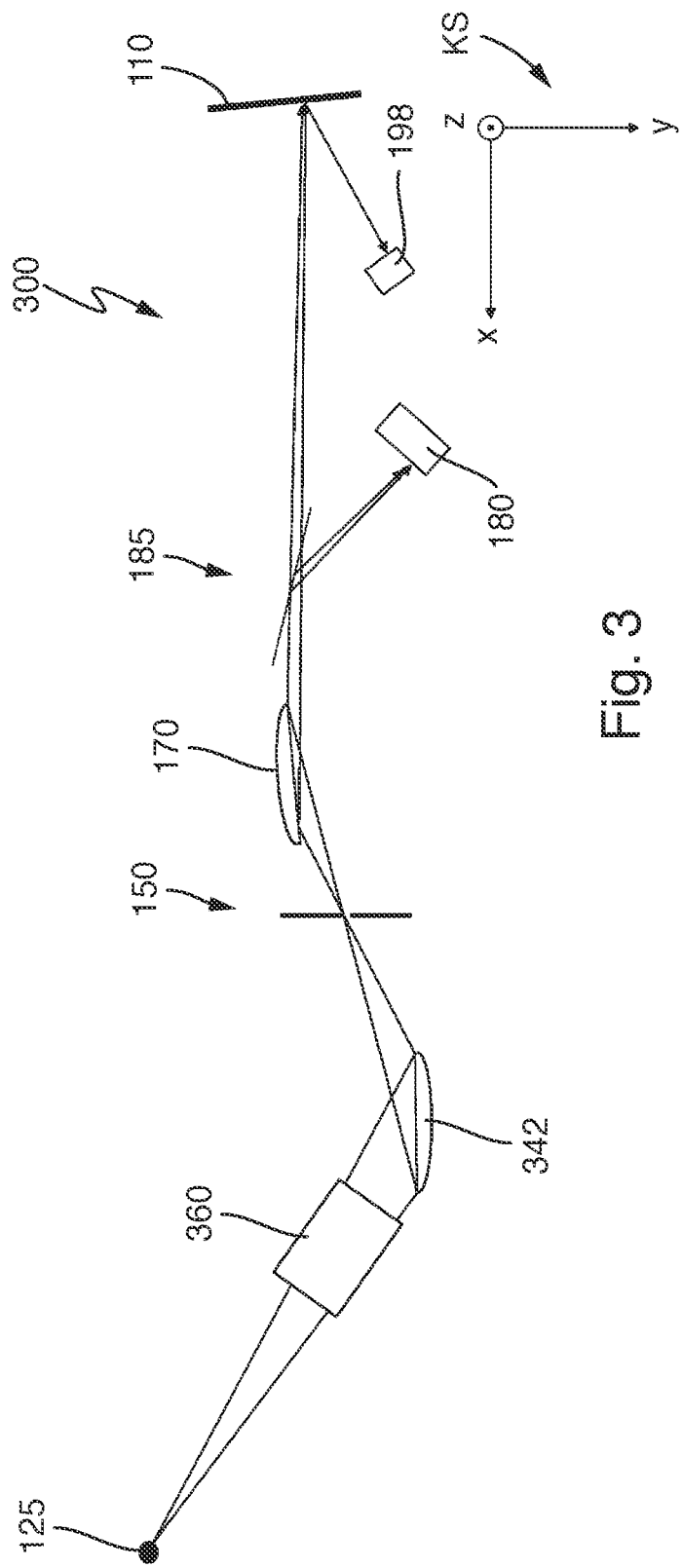
FIG. 3 shows a plan view of a second exemplary embodiment of an EUV reflectometer illustrated in an x-y-plane.
Figure 4:
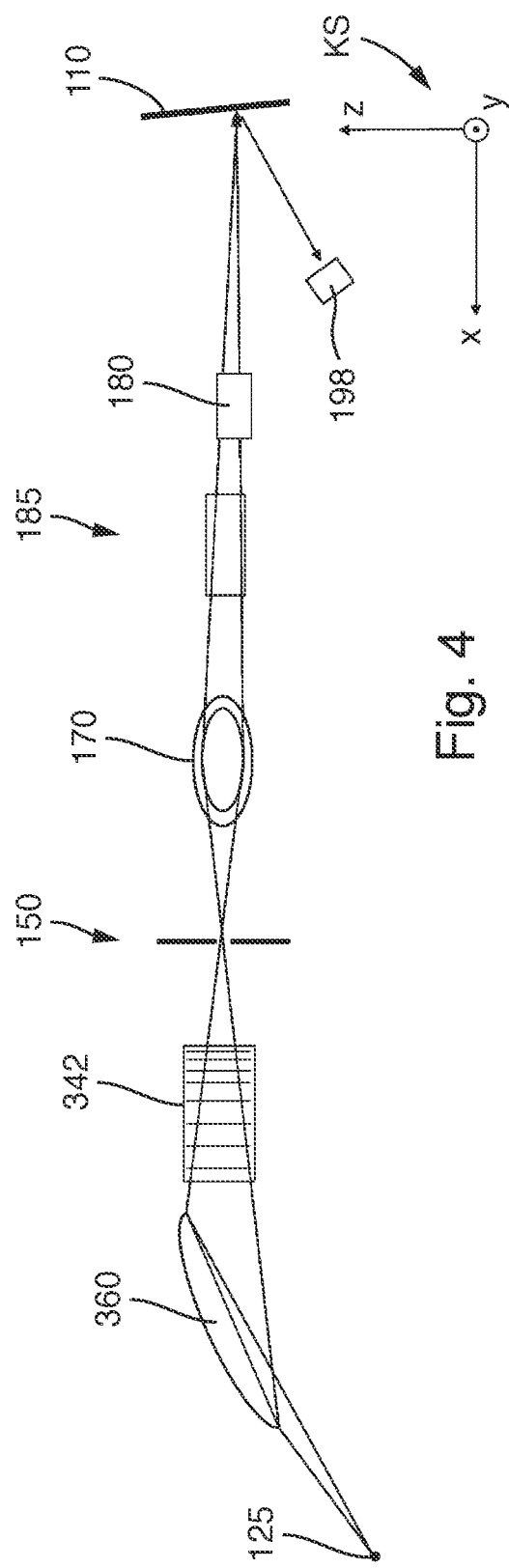
FIG. 4 shows a schematic side view of the exemplary embodiment from FIG. 3 illustrated in an x-z-plane.

FIGS. 3 and 4 show a second exemplary embodiment of an EUV reflectometer 300, where FIG. 3 shows a plan view in the x-y-plane corresponding to FIG. 1, and FIG. 4 shows a side view in the x-z-plane corresponding to FIG. 2.

A notable difference with respect to the first exemplary embodiment resides in the configuration of the front reflection element 360, which forms the first optical element of the beam shaping unit 130 in the beam direction and which deflects the EUV radiation coming from the source spot 125 of the EUV radiation source 120 in the direction of the downstream concavely curved reflection grating 342 and focuses it in one direction. While the front reflection element 160 of the first exemplary embodiment is configured and arranged as a sagittally cylindrical reflection element, the front reflection element 360 of the second exemplary embodiment is fashioned as a plano-elliptical reflection element. The reflective optical surface of the plano-elliptical reflection element has the shape of an ellipse (cf. FIG. 4) in a direction lying in the x-z-plane, while the reflective surface runs in planar fashion in a direction substantially perpendicular thereto (cf. FIG. 3). The focal line in the case of this plano-elliptical reflection element runs parallel to the planar direction of the reflective surface, i.e., substantially parallel to the y-direction in the example in FIG. 4. The other components can be identical or approximately identical to the first exemplary embodiment, which is why they are designated by the same reference signs. In this respect, reference is made to the description in the context thereof.

Figure 5:
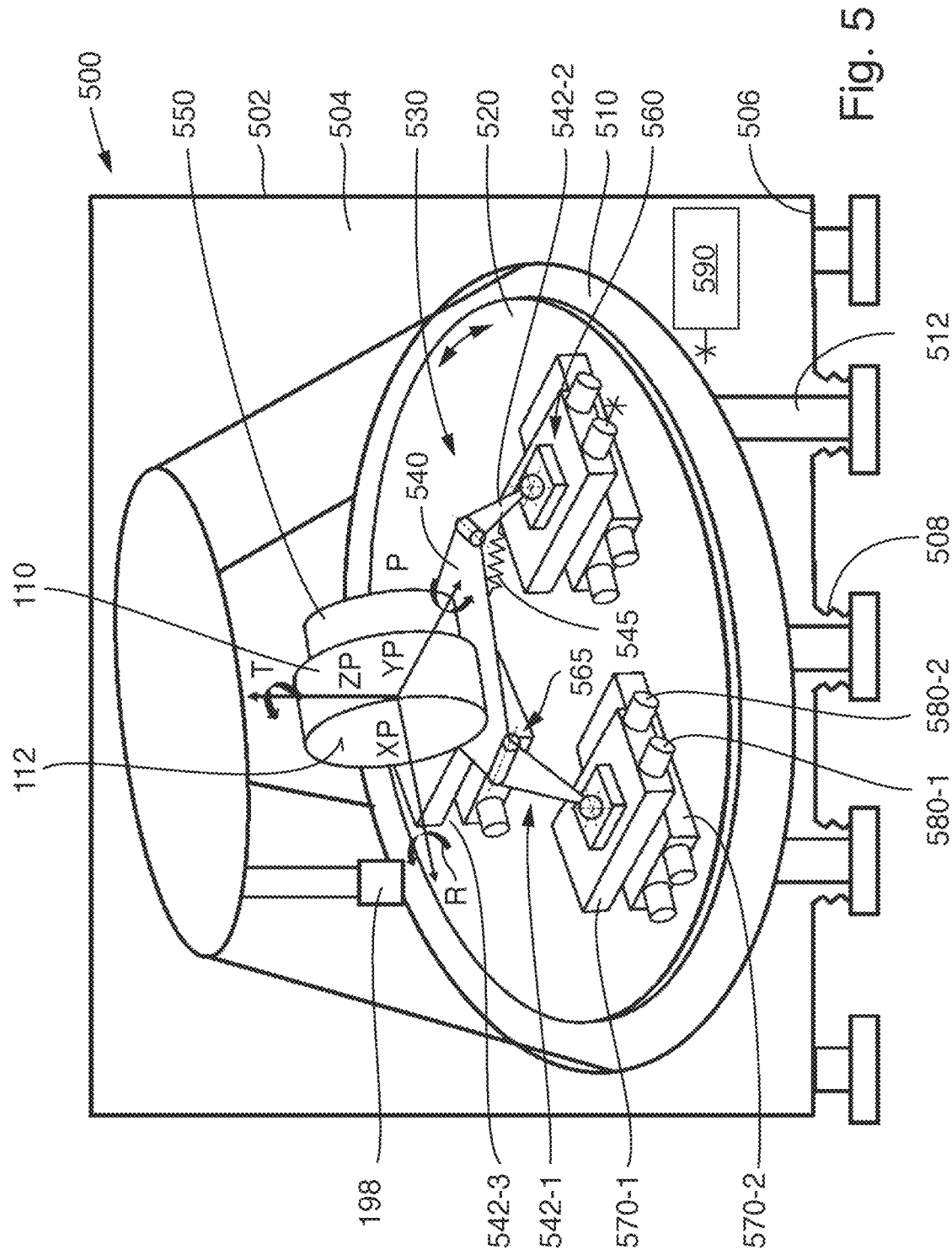
FIG. 5 shows a schematic illustration of components of one exemplary embodiment of a positioning device for holding and positioning a test object, which positioning device is usable in an EUV reflectometer.

With reference to FIG. 5, an explanation will now be given of an exemplary embodiment of a positioning device 500 configured to hold the test object 110 to be measured and to position it in relation to the measurement beam 190 in a plurality of degrees of freedom in such a way that, during operation of the EUV reflectometer, the measurement beam impinges on the reflective surface 112 at a predefinable measurement place or a predefinable measurement location 115 in the region of a measurement spot 195 and at a predefinable angle of incidence or angle of incidence range.

All movable mechanical components of the positioning device 500 are accommodated in the interior of a vacuum chamber 504, which is enclosed by an air-tight sealable housing 502 and which can be evacuated with the aid of connected pumps. A control unit 590 is provided for the control of the movement axes, which control unit controls the drives of the movement axes and also processes signals from sensors (e.g., displacement encoders, angle encoders, etc.) for this control.

The positioning device 500 has a base frame 510, which carries all movable components of the positioning device. The base frame 510 rests on a plurality of adjusting feet 512, which are individually height-adjustable and hold the base frame 510 at a distance above the baseplate 506 of the vacuum chamber. The adjusting feet reach through lead-through openings in the baseplate 506 of the vacuum housing without touching contact. The free space around the adjusting feet is mechanically decoupled from the housing 502 of the vacuum chamber with the aid of membrane bellows 508 or other sealing devices having a vibration-decoupling effect. The adjusting feet can be installed on the floor of a hall. All mechanical components of the positioning device are thus mechanically decoupled mechanically from possible vibrations of the housing 502 of the vacuum chamber. The adjusting feet are arranged directly below two concentric axial bearings of the vertically rotatable main carrier in order to avoid torques which, in the case of weight displacement above the rotatable main carrier, may lead e.g., to a tilting of the vertical rotation axis of said main carrier.

The base frame 510 carries a main carrier 520 in the form of a rotary table 520, which is rotatable about a vertical axis T with the aid of a rotary drive (not illustrated). The associated movement axis is referred to as a theta axis. The axis T is space-fixed and runs parallel to the z-axis of the coordinate system KS of the EUV reflectometer as shown in FIGS. 1 to 4.

The rotary table 520 carries components of a parallel kinematic multi-axis system 530 having six actuators that act on a common platform 540. The platform 540, also referred to as a saddle unit, can be moved in a plurality of linear and rotational axes in space with the aid of the actuators. To put it more precisely, there are three translational and three rotational degrees of freedom of movement.

The platform 540 carries a holding device 550 having holding elements configured for holding the test object 110 to be measured. The platform 540 also carries a rotary drive (not illustrated) for rotating the holding device about a rotation axis R. The associated movement axis is referred to here as a rho axis. It is evident that the orientation of the R axis or the rho axis in space can change depending on the position of the platform 540.

The parallel kinematic multi-axis system 530 has a tripod arrangement having exactly three legs 542-1, 542-2, 542-3, which are arranged substantially in a triangular arrangement relative to one another. Each of the legs has a fixed, i.e., non-variable, length and is movably coupled to the platform 540 by its second end facing the platform 540 with the aid of a second joint arrangement 565. The second joint arrangement is configured in each case as a simple rotary joint that allows the coupled leg to be able to pivot relative to the platform 540 about a pivoting axis 566 oriented horizontally or at a greater or lesser angle relative to the horizontal, depending on the orientation of the platform.

The lower ends of the legs facing away from the platform 540 are supported in each case by way of a first joint arrangement 560 with a triaxially movable ball-and-socket joint on the top side of a two-axis system constructed in the manner of a compound table. By way of example, a cardan joint arranged on a rotary bearing can also be used instead of a ball-and-socket joint. To put it more precisely, the first joint arrangements 560 offering three rotative degrees of freedom are each situated on a slide 570-1 that is movable in a controlled manner in two mutually perpendicular directions in a horizontal reference plane running perpendicular to the rotation axis T of the rotary table or parallel to the carrying surface of the rotary table 520. The base-side articulation points of the legs 542-1, 542-2, 542-3 of the tripod arrangement are thus movable in each case independently of one another into different positions in a reference plane.

In the variant illustrated, the upper slides 570-1 carrying at their top side in each case the joint arrangement 560 for coupling the lower ends of the legs are movable parallel to a yp-direction of the coordinate system of the positioning device. The upper slides are carried by lower slides 570-2 running on guides at the top side of the rotary table 520. The lower slides 570-2 are each movable horizontally in an xp-direction, perpendicular to the yp-direction, of the coordinate system of the positioning device. The orientation of these horizontal directions in space changes with the rotation about the rotation axis T (via the theta axis). The zp-direction orthogonal to the xp-direction and to the yp-direction runs parallel to the rotation axis T of the rotary table 530.

For each of the slide movements or for each of these slides 570-1, 570-2, in each case two separate drive motors 580-1, 580-2 are provided, which rotate associated spindles and act on the same translational movement axis. What can be achieved, inter alia, as a result is that each of the drive motors, which are preferably identical to one another, has to provide only a relatively low drive power and accordingly scarcely heats up. Problems of inadequate heat dissipation such as can arise for drive motors arranged in a vacuum can thus be reliably avoided.

The tripod arrangement distributes the load and the movement of the load of the test object among a large number of drives, which is greater than the number of required degrees of freedom. With the aid of the drives 580-1, 580-2 for the slides, which drives are controllable in pairs in each case, the foot points of the legs can be moved in each case synchronously or independently of one another in the xp-direction and yp-direction. An inclination of the test object about a horizontal axis P running parallel to the xp-direction can be achieved for example by the articulation point of the leg 542-1 arranged at the front left in the drawing being moved outward in the xp-direction, while the lower articulation points of the other two legs each remain in their position. A rotational movement axis, referred to here as a phi axis, is thus realized as a result. The platform 540 with the test object carried thereby tilts forward as a result, which corresponds to a rotation about the axis P. If all the upper slides 570-1 are moved synchronously and with the same travel in the xp- or yp-direction, the entire platform can be moved by the travel in the corresponding direction, without the inclination of the test object (about the P axis) or the rotational position of the test object 110 (about the R axis) being changed. A displacement of the test object 110 in the vertical zp-direction can be achieved by the articulation points of the legs that face the base being moved inward synchronously (this results in the platform and the test object being raised upward) or being moved outward synchronously (this results in the test object being lowered downward).

Depending on the angular position of the test object, different static and dynamic forces in an axial direction can act on the drivetrains of the tripod arrangement (drive motor, drive spindle and spindle nut, spindle end bearing). In order to reduce these force components, spring assemblies (e.g., bundle of springs in which the total spring constant can be adapted by increasing or reducing the number of springs) can be fitted to the tripod joints and can be connected to the movable platform 540 of the tripod arrangement. The motor torques to be applied can be reduced as a result.

A spring arrangement 545 is shown by way of example in FIG. 5, said spring arrangement acting on the leg 542-2, visible on the right, at one end and on the platform 540 at the other end.

Figure 8:
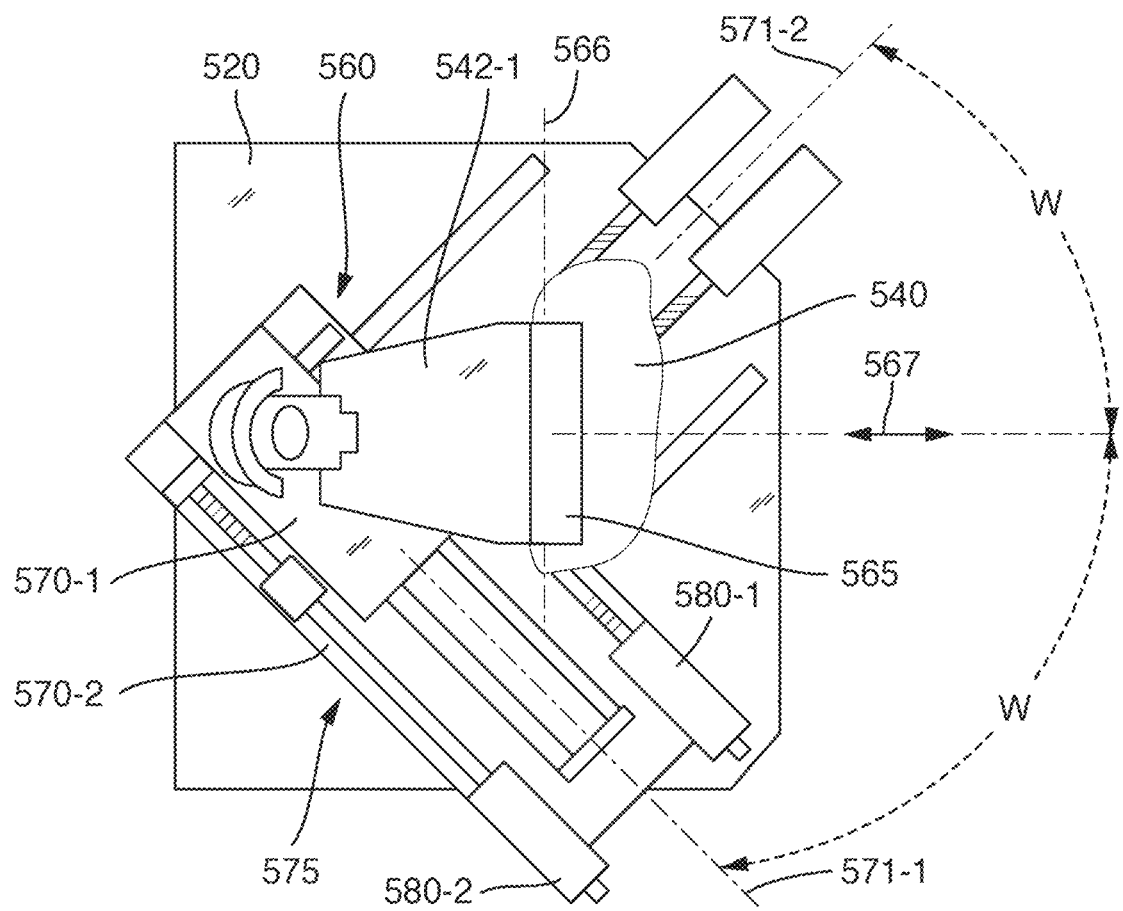
FIG. 8 shows a schematic plan view of the region of the mounting of a tripod leg on a cross slide.
Figure 9:
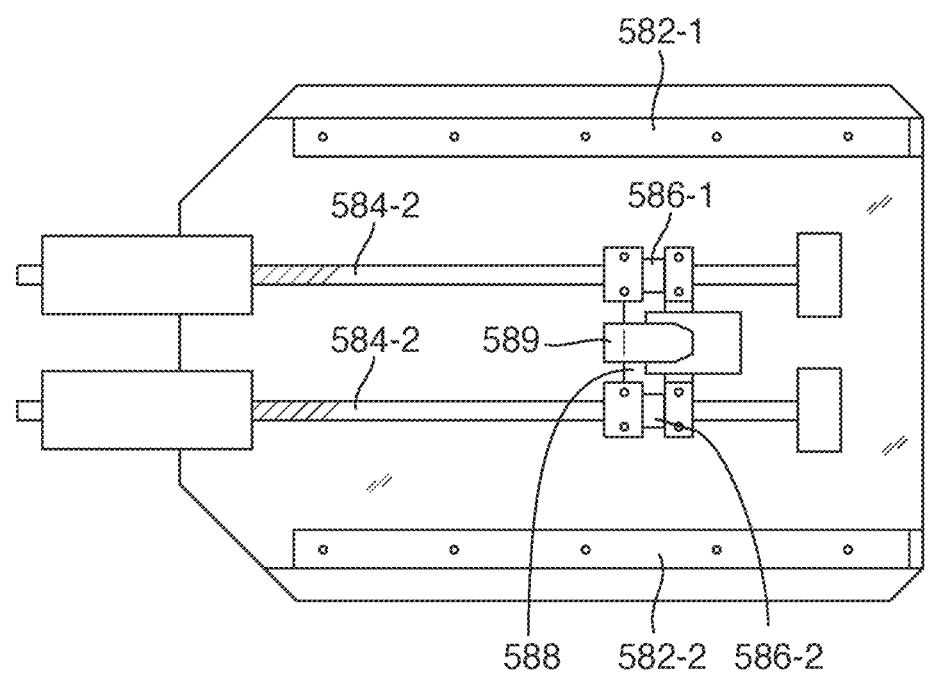
FIG. 9 shows a schematic plan view of a parallel drive with an encoded shaft.

With reference to FIGS. 8 and 9, measures will be explained which, individually or in combination, can contribute to achieving rapid positioning with high positioning accuracy and high repetition accuracy of the positioning in a vacuum, even in the case of relatively large and heavy test objects. To that end, FIG. 8 shows a plan view of the region of a tripod leg that is supported by way of a ball-and-socket joint on the upper slide of a cross slide. FIG. 9 shows a schematic plan view of two drive motors for a slide (not illustrated), the drive motors forming a parallel drive having an encoded shaft for the active correction of the shaft orientation.

The first leg 542-1 of the tripod arrangement discernible in the plan view in FIG. 8 is coupled to the platform 540 with the aid of a second joint arrangement in the form of a single-axis pivoting joint 565. The pivoting joint defines a pivoting axis 566, about which the first leg can be pivoted relative to the platform 540. The opposite lower end of the leg 542-1 with the ball-and-socket joint in the region of the first joint arrangement 560 in this case moves in a pivoting plane oriented perpendicular to the pivoting axis 566, said pivoting plane intersecting the movement plane of the slide 570-1 (reference plane) in a line which defines that direction in which the end of the leg with the ball-and-socket joint is displaced when the first leg 542-1 is pivoted. This direction is referred to here as a displacement direction 567.

The compound table 575 carrying the ball-and-socket joint of the first joint arrangement 560 comprises the first slide 570-1, on the top side of which the ball-and-socket joint is arranged, and also a second slide 570-2 arranged underneath and carrying the first slide 570-1. The rectilinear movement direction 571-1 of the first slide and the rectilinear movement direction 571-2 of the second slide run orthogonally to one another parallel to the reference plane and each form an angle W of 45° with the displacement direction 567 of the pivoting movement of the leg. In other words: the slides 570-1 and 570-2 are arranged horizontally and mutually perpendicularly. In addition, they are arranged relative to the respective tripod leg 542-1, 542-2 and 542-3 such that the projection of the longitudinal direction of a leg (connection between ball-and-socket joint and saddle joint) onto the horizontal lies at approximately 45° with respect to the direction of movement of the slides 570-1 and 570-2.

What can be achieved by this arrangement is that the maximally acting forces in the region of the movement of this leg of the tripod arrangement are distributed on average approximately in equal portions between axial and non-axial directions, the "axial directions" corresponding to the movement directions 571-1, 571-2 of the 2 slides of the compound table. Consequently, one portion of the weight loading the first joint arrangements acts as a transverse force with respect to the guide rails of the linear guide systems and a more or less equal portion acts parallel to the movement directions of the slides. The loading of the slide drives 580-1, 580-2 is relieved as a result. The use of suitable material pairings in all bearings and joints makes it possible to provide smooth-running, wear-resistant movement systems. Bearings or other component pairings in which elements composed of ceramic or elements composed of poly-tetrafluoroethylene (PTFE) derivatives are combined with elements composed of high-grade steel are preferably provided.

As already mentioned above, two separate drive motors (for example drive motors 580-1 and 580-2) are provided for each of the slide movements of the slides of the compound table. FIG. 9 shows such a drive system without the slide that slides or rolls on guide rails 582-1, 582-2 running parallel to one another. During operation, each of the drive motors 580-1 and 580-2 rotates a trapezoidal threaded spindle 584-1, 584-2, on each of which a spindle nut 586-1, 586-2 runs. The latter is mounted on the underside of the driven slide in the finished assembled drive system.

The spindle nuts of the spindles associated with the two drive motors 580-1 and 580-2 are connected to suitable joints by a shaft assembly 588. The shaft assembly passively prevents the spindle nuts from getting stuck on the spindles 584-1 and 584-2 when the two motors are driven slightly asynchronously. The torsion of the shaft assembly is registered by an encoder 589, such that the motors can also be actively controlled in order to correct a shaft torsion.

The spindle nuts 586-1, 586-2 are thus mechanically coupled via the shaft 588. An encoder 589 mounted on the shaft 588 detects the shaft orientation, which should ideally be oriented perpendicular to the movement direction of this parallel drive system. If one of the drives 580-1 and 580-2 leads or lags behind the respective other drive, then an inclination or a change of the shaft orientation arises in the region of the shaft. This is detected by the encoder and converted into signals that are used by the controller in order to counteract the incorrect orientation of the shaft 588 and to actively correct the shaft orientation. This fosters unimpeded smooth running of the slide of this drive system even in the event of high and possibly nonuniform loading of the slide, as a result of which the positioning speed and the positioning accuracy can also be influenced positively.

It should also be mentioned that the detector 198 for detecting the reflected measurement beam is likewise mounted movably, such that the detector can be moved into a measurement position depending on the spatial location of the test object 110 in each case in such a way that the radiation reflected by the test object surface 112 is incident on the sensitive area of the detector 198 completely and without overexposure of the detector. The detector can be for example a silicon or germanium photodiode. Diode arrays having two or more photodiodes are also possible.

Figure 10:
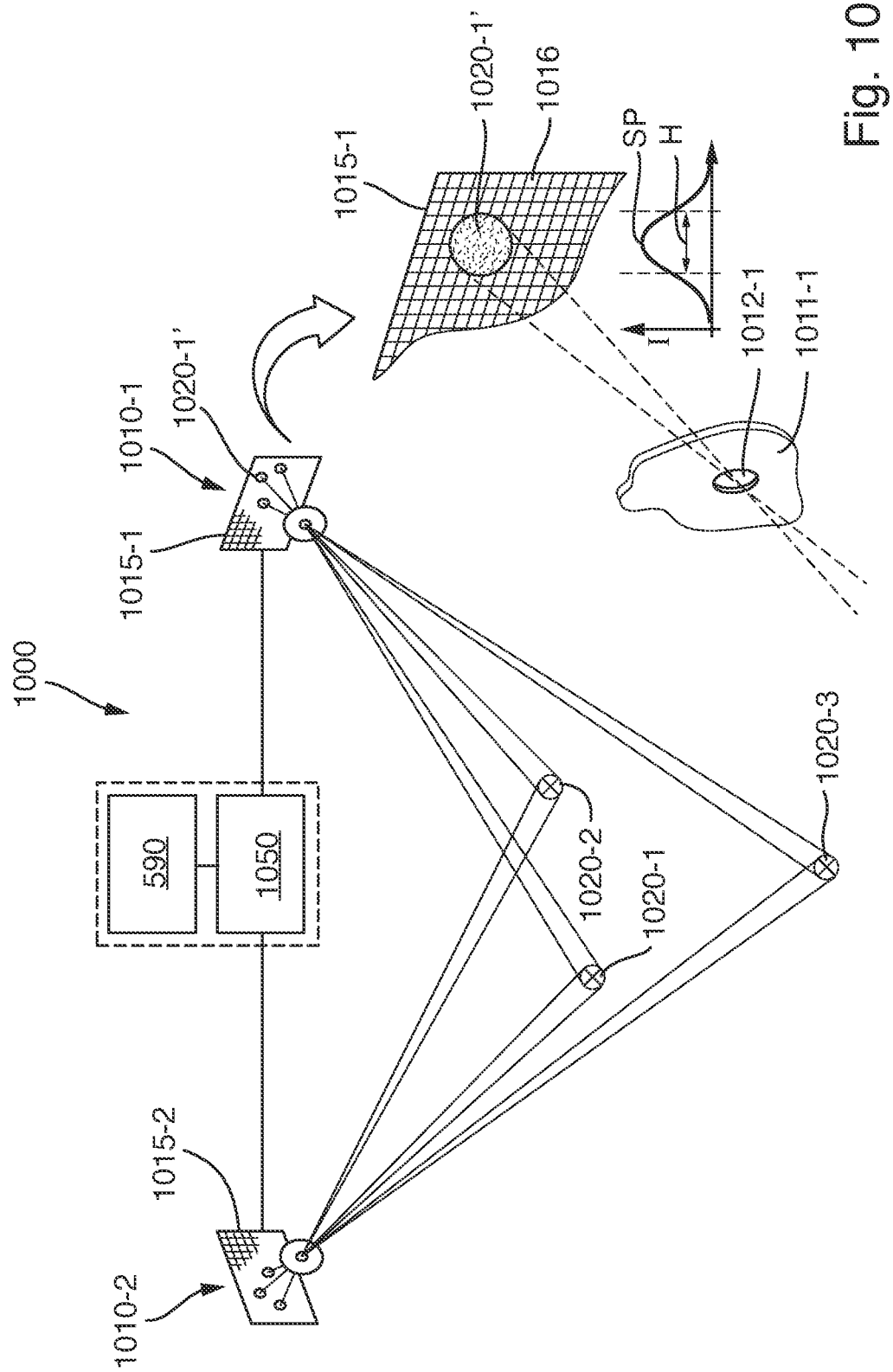
FIG. 10 shows a schematic illustration of an external optical measuring system for the photogrammetric measurement of the pose of a test object.

With reference to FIGS. 6, 7 and 10, an explanation will now be given of examples of separate, load-independently operating measuring systems which are provided in some embodiments in order, independently of the encoders and other sensors in the drivetrains of the positioning device 500, to exactly determine the position and orientation of the test object 110 in space, and in particular in relation to the beam shaping unit 130 or the measurement beam 190. Position accuracies of the test object of 100 μm or less (e.g., down to 30 μm) and/or orientation accuracies in the range of less than 1/100° (e.g., down to) 5/1000° can thus be achieved systematically.

The independent measuring system 600 in FIG. 6 operates electromechanically and has a measuring arm 610 configured as an articulated arm and carried by a stand 620, which is arranged outside the vacuum chamber and is mounted fixedly on the floor (e.g., granite slab). The articulated arm 610 has a probe 612 at its front end extending into the vacuum chamber 504, which probe can be placed at an envisaged location of the holding device 550 or at the test object 110. The probe 612 is connected to a space-fixed fixed point (for example the granite plinth on which the carrier 620 is situated) via the articulated arm 610. The measuring arm is equipped with sensors that allow exact determination of the position of the probe tip of the probe 612 in relation to the fixed point.

The sensors may include for example length interferometers and/or encoders in the joints. With the aid of the positionally fixed measuring system 600, independently of the information offered by the actuators and sensors of the positioning device 500, it is thus possible to exactly determine the spatial location of the test object 110 in space in relation to the beam shaping unit 130 in five degrees of freedom.

In the exemplary embodiment in FIG. 7, provision is made of a positionally fixed measuring system 700 having at least two cameras 710-1, 710-2, which are directed into the interior of the vacuum chamber and can detect the region of the holding device 550 and of the test object 110 held therein. In each case two, three or more reference marks 720 are attached to the holding device 550 and/or the test object 110, the position of which reference marks can be determined with high precision with the aid of the camera and the image processing system connected thereto. From the position information of the individual reference marks, the spatial location of the test object in the space-fixed coordinate system can be determined exactly through triangulation. The cameras can be arranged completely within the vacuum chamber 504, such that only electrical signals for image processing have to be passed toward the outside. In the case of the example, the cameras are arranged outside the vacuum and are directed at the test object 110 and the holding device 550 through flanges with viewing windows.

With reference to FIG. 10, an exemplary embodiment of a space-fixed external in-situ measuring system 1000 is described, which can correspond to the optical measuring system from FIG. 7 or deviate therefrom in details. The optical measuring system 1000 operating without contact has at least two cameras 1010-1, 1010-2 which are connected to the evaluation unit 1050 of an image processing system in a signal-transmitting manner. The evaluation unit is a functional part of the control unit 590, to which the actuators and sensors of the positioning device 500 are also connected.

The cameras are directed into the interior of the vacuum chamber (not illustrated in FIG. 10) in such a way that they can capture the region of the holding device 550 and of the test object 110 held therein. In order that large optical components that are already customary even nowadays and optical components of future generations can be measured precisely, the measuring system 1000 is designed for determining in situ all six degrees of freedom of the test object and/or of the holding device in a vacuum over a distance of up to approximately 3 m in a measurement range of approximately 1 m and for angular differences of up to 360°.

A non-contact measuring system based on photogrammetry is involved. In order to be able to detect the entire object with sufficient accuracy, the first camera 1010-1 and the second camera 1010-2 can be arranged immediately outside the vacuum chamber directly behind a viewing window (not illustrated), which is formed by a thin (thickness of approximately 5 µm), vacuum-proof transparent film in the case of the example. Owing to the size of the measurement object, the cameras must have relatively large acceptance angles. In order to be able to measure such measurement geometries without distortion, the cameras 1010-1, 1010-2 are each embodied as a pinhole camera without a lens. In this regard, the first pinhole camera 1010-1, in the front chamber wall 1011-1 facing the positioning device, has a circular hole 1012-1, through which light can radiate into the otherwise closed chamber of the camera. A two-dimensional image sensor 1015-1 of the pinhole camera is mounted at a distance behind the hole or the pinhole stop 1012-1, the light-sensitive area of said image sensor having a multiplicity of pixels 1016 in rows and columns (see enlarged detail).

The two pinhole cameras 1010-1, 1010-2 are mounted at a fixed angle with respect to one another with in each case a fixed distance between the pinhole stop and the image sensor. In each case at least three reference marks 1020-1, 1020-2, 1020-3 are attached to the holding device 550 and/or to the test object 110, the position of which reference marks can be determined with the aid of the at least two pinhole cameras and the image processing system connected thereto. The reference marks are arranged such that at least three of the reference marks lie simultaneously in the acceptance region of both pinhole cameras, such that a pattern with images 1020-1' of the reference marks arises both on the first image sensor 1015-1 and on the second image sensor 1015-2.

Actively luminous reference marks in the form of light-emitting diodes with sufficiently high light power are used here as reference marks. Preferably, the light power is dimensioned such that the intensity resolution of the LED images that can be recorded within one second is at least 12 bits. The LED modules provided with the LEDs are fabricated in an embodiment compatible with ultrahigh vacuum.

Preferably, the diameter of the hole of the pinhole stop 1012-1 is chosen such that the full width at half maximum H of an image 1020-1' of an LED corresponds to a multiple of the pixel size, for example to at least ten times the latter. The evaluation device then evaluates the image information using the effect of super-resolution. For this purpose, it is possible to determine e.g., the position of the geometric centroid SP of the intensity distribution in the image of a reference mark with sub-pixel accuracy. What can be achieved as a result is that the exact position of the associated reference mark in space can also be determined with high spatial resolution. In experiments it was possible to show that the relative accuracy of the position determination in the image evaluation in the case of this arrangement, as a result of using the effect of super-resolution, can be approximately 3 µm to 8 µm depending on the object distance, and the absolute accuracy can be approximately 30 µm.

In all cases, the measuring systems 600 or respectively 700 or 1000 operate load-independently in the sense that their precision remains independent for example of the weight of the test object and the loadings exerted thereby on the positioning device. As a result, it is possible to ensure systematically high approach accuracies for the positioning of the test object 110. The signals of a positionally fixed measuring system can be processed inter alia for calculating the accurate position of the measurement spot and also for determining the angle of incidence of the measurement beam 190 on the reflective surface of the test object during the measurement.

What is claimed is:

1. An EUV reflectometer for measuring a reflectivity of a test object having a reflective effect for extreme ultraviolet (EUV) radiation, depending on a wavelength of the EUV radiation and on an angle of incidence of the EUV radiation on a reflective surface of the test object, comprising:
an EUV radiation source configured to emit the EUV radiation;

a beam shaping unit configured to receive the EUV radiation from the EUV radiation source and to generate a measurement beam;

a positioning device configured to hold the test object and to position the test object in relation to the measurement beam in a plurality of degrees of freedom so that, during operation, the measurement beam impinges on the reflective surface at a predefined measurement location in a region of a measurement spot at a predefined angle of incidence, and a detector that is sensitive to the EUV radiation, to detect the EUV radiation reflected by the reflective surface, wherein (a) the positioning device has a main carrier, which is configured to rotate about a vertical rotation axis (T) via a rotary drive and on which a parallel kinematic multi-axis system having a multiplicity of actuators is arranged, which actuators act on a common platform such that the platform is movable in three linear and three rotational degrees of freedom in space via the actuators, wherein the platform carries a holding device configured to hold the test object and a rotary drive configured to rotate the holding device about a rotation axis (R), and (b) a measuring system assigned to the positioning device and configured to determine the location and the position of the test object in space and/or in relation to the measurement beam, wherein the measuring system is independent of drives of the actuators.

2. The EUV reflectometer as claimed in claim 1, wherein the measuring system is an optical measuring system comprising at least two cameras and an evaluation device for evaluating image signals of the cameras or signals derived from the image signals of the cameras, the cameras being configured to align with reference marks attached directly to the test object and/or on the holding device for the test object.

3. The EUV reflectometer as claimed in claim 2, wherein the cameras are arranged outside a vacuum chamber enclosing the positioning device and are directed at the test object and/or the holding device for the test object through respective viewing windows.

4. The EUV reflectometer as claimed in claim 2, wherein the cameras are embodied as lensless pinhole cameras each having a hole facing the positioning device and a two-dimensional image sensor fitted at a distance behind the hole.

5. The EUV reflectometer as claimed in claim 2, wherein the measuring system has actively luminous reference marks.

6. The EUV reflectometer as claimed in claim 5, wherein the actively luminous reference marks are light-emitting diodes (LEDs).

7. The EUV reflectometer as claimed in claim 4, wherein the measuring system satisfies the following conditions:
  (i) there are at least two pinhole cameras which are arranged at a fixed angle with respect to one another with in each case a fixed distance between a pinhole stop of the pinhole camera and the image sensor in such a way with respect to one another that in each case at least three common reference marks are situated at constant distances with respect to one another in a capture region of the pinhole cameras;
  (ii) a diameter of the pinhole stop, a distance between the pinhole stop and the image sensor and a spatial pixel density of the image sensor are configured such that a full width at half maximum (H) of an image of a reference element imaged via the pinhole stop on the image sensor has a magnitude such that the image covers a multiplicity of pixels of the image sensor.

8. The EUV reflectometer as claimed in claim 5, wherein the measuring system satisfies the following conditions:
  (i) there are at least two pinhole cameras which are arranged at a fixed angle with respect to one another with in each case a fixed distance between a pinhole stop of the pinhole camera and the image sensor in such a way with respect to one another that in each case at least three common reference marks are situated at constant distances with respect to one another in a capture region of the pinhole cameras;
  (ii) a diameter of the pinhole stop, a distance between the pinhole stop and the image sensor and a spatial pixel density of the image sensor are configured such that a full width at half maximum (H) of an image of a reference element imaged via the pinhole stop on the image sensor has a magnitude such that the image covers an area of at least 10×10 pixels of the image sensor.

9. The EUV reflectometer as claimed in claim 2, wherein the evaluation device is configured to carry out an image evaluation using a super-resolution effect.

10. The EUV reflectometer as claimed in claim 1, wherein the parallel kinematic multi-axis system has a tripod arrangement having exactly three legs, each of which is movably coupled to the main carrier via a first joint arrangement at a first end facing the main carrier, and to the platform via a second joint arrangement at a second end facing the platform.

11. The EUV reflectometer as claimed in claim 10, wherein the first joint arrangement has a joint that is configured to rotate in a plurality of axes, which joint couples the first end of the leg to a slide, which is configured to move in a reference plane in two mutually perpendicular directions, wherein the first joint arrangement has a compound-table assembly having two mutually orthogonal single-axis linear guide systems configured to move the triaxially rotatable joint in any desired directions within the reference plane.

12. The EUV reflectometer as claimed in claim 11, wherein the joint is a ball-and-socket joint or a cardan joint arranged on a rotation axis, which joint couples the first end of the leg to a slide, which is configured to move in a reference plane in two mutually perpendicular directions, wherein the first joint arrangement has a compound-table assembly having two mutually orthogonal single-axis linear guide systems configured to move the triaxially rotatable joint in any desired directions within the reference plane.

13. The EUV reflectometer as claimed in claim 10, wherein drives and guide systems of the tripod arrangement are configured such that maximally effective forces on actuators, slides and guides of the drives and guide systems are distributed on average in similar proportions between axial and non-axial directions, wherein an axial direction runs parallel to a movement direction of a slide.

14. The EUV reflectometer as claimed in claim 10, wherein the second joint arrangement is embodied as a single-axis pivoting joint, which enables the leg to pivot relative to the platform about a pivoting axis running transversely with respect to an extent of the leg such that an end of the leg facing the first joint arrangement is displaced upon pivoting the leg about the pivoting axis in a reference plane in a displacement direction, and wherein the first joint arrangement has crossed slides with movement directions running transversely with respect to the displacement direction.

15. The EUV reflectometer as claimed in claim 10, wherein at least some of the actuators, for producing a rectilinear linear movement of a driven component, have a trapezoidal threaded spindle, which is configured to be driven rotatably by the actuator and on which runs a spindle nut coupled to the component.

16. The EUV reflectometer as claimed in claim 1, wherein in the case of at least one translational movement axis of the parallel kinematic multi-axis system, two separate drive motors are provided for jointly moving the movement axis.

17. The EUV reflectometer as claimed in claim 16, wherein the two drive motors form a parallel drive and the parallel drive has a shaft configured to actively correct an orientation of the shaft.

18. The EUV reflectometer as claimed in claim 17, wherein the shaft is an encoded shaft.

19. The EUV reflectometer as claimed in claim 10, wherein each leg of the tripod arrangement is assigned a spring arrangement having at least one spring, wherein the spring arrangement acts on the leg at one end of the spring and on the platform at an opposing end of the spring.

20. The EUV reflectometer as claimed in in claim 1, wherein:
    the beam shaping unit comprises a monochromator for setting the wavelength of the measurement beam, wherein the monochromator has a concavely curved reflection grating and, disposed downstream of the reflection grating, a stop arrangement with an exit slit,
    a front reflection element is arranged in the beam path upstream of the reflection grating and a back reflection element is arranged in the beam path downstream of the exit slit;
    the front reflection element and the reflection grating are embodied such that in a region of the stop arrangement a first intermediate focus is produced in a first direction and a second intermediate focus is produced in a second direction, perpendicular to the first direction, and
    the stop arrangement has a first exit slit having a first slit width, which is set in the first direction, and a second exit slit having a second slit width, which is set in the second direction.

21. The EUV reflectometer as claimed in claim 16 and satisfying at least one of the following conditions:
    (a) the reflection grating of the monochromator is embodied as a reflection grating having a variable line spacing;
    (b) the back reflection element is embodied as an ellipsoidal reflection element having a first curvature in a first direction and a second curvature in a second direction perpendicular to the first direction;
    (c) the front reflection element is embodied as a sagittally plano-cylindrical reflection element or as a concave plano-elliptical front reflection element.

22. The EUV reflectometer as claimed in claim 20, further comprising a reference detector and a beam splitter configured to couple out a portion of the EUV radiation of the measurement beam to the reference detector.

23. The EUV reflectometer as claimed in claim 20, wherein a ratio between image distance and object distance of a first optical subsystem of the beam shaping unit, wherein the first optical subsystem includes the front reflection element and the reflection grating, is less than 3, and wherein the ratio between the image distance and the object distance of a second subsystem of the beam shaping unit, wherein the second subsystem includes the back reflection element, is less than 7.

\* \* \* \* \*

UNITED STATES PATENT AND TRADEMARK OFFICE
CERTIFICATE OF CORRECTION

| | | |
|---|---|---|
| PATENT NO. | : 12,152,983 B2 | Page 1 of 1 |
| APPLICATION NO. | : 17/882101 | |
| DATED | : November 26, 2024 | |
| INVENTOR(S) | : Giessel et al. | |

It is certified that error appears in the above-identified patent and that said Letters Patent is hereby corrected as shown below:

On the Title Page

Page 2, Column 2, Line 23, delete "Techology," and insert -- Technology, --.

In the Specification

Column 15, Line 17, delete ") 0°" and insert -- 0°) --.

Column 15, Lines 18-19, delete ") 90°." and insert -- 90°). --.

Column 17, Line 29, delete "The" and insert -- the --.

Column 22, Line 57, delete "to) 5/1000°" and insert -- to 5/1000°) --.

In the Claims

Column 27, Line 26, In Claim 20, delete "in in" and insert -- in --.

Signed and Sealed this
Thirteenth Day of May, 2025

Coke Morgan Stewart
*Acting Director of the United States Patent and Trademark Office*